(12) United States Patent
Freed et al.

(10) Patent No.: US 11,614,333 B2
(45) Date of Patent: *Mar. 28, 2023

(54) SYSTEM AND METHOD FOR MULTI-PLANE ROUTING

(71) Applicant: Polaris Industries Inc., Medina, MN (US)

(72) Inventors: Erik S. Freed, New Brighton, MN (US); Kyle K. Estes, Rosemount, MN (US); Randy L. Milbert, Saint Paul, MN (US)

(73) Assignee: Polaris Industries Inc., Medina, MN (US)

( * ) Notice: Subject to any disclaimer, the term of this patent is extended or adjusted under 35 U.S.C. 154(b) by 738 days.

This patent is subject to a terminal disclaimer.

(21) Appl. No.: 16/448,072

(22) Filed: Jun. 21, 2019

(65) Prior Publication Data

US 2019/0390966 A1 Dec. 26, 2019

Related U.S. Application Data

(63) Continuation of application No. 13/472,866, filed on May 16, 2012, now Pat. No. 10,345,108.

(51) Int. Cl.
*G01C 21/32* (2006.01)
*G01C 21/34* (2006.01)

(52) U.S. Cl.
CPC ......... *G01C 21/32* (2013.01); *G01C 21/3423* (2013.01)

(58) Field of Classification Search
CPC .................... G01C 21/32; G01C 21/3423

USPC ....................................................... 701/533
See application file for complete search history.

(56) References Cited

U.S. PATENT DOCUMENTS

| | | | |
|---|---|---|---|
| 4,546,385 A * | 10/1985 | Anastassiou | G06T 9/00 348/390.1 |
| 4,715,031 A | 12/1987 | Crawford | |
| 4,745,596 A | 5/1988 | Sato | |
| 5,040,168 A | 8/1991 | Maue | |
| 5,769,051 A | 6/1998 | Bayron | |
| 5,886,627 A | 3/1999 | Brady | |
| 6,275,231 B1 | 8/2001 | Obradovich | |
| 6,339,745 B1 | 1/2002 | Novik | |
| 7,956,861 B2 | 6/2011 | Case | |
| 8,005,613 B2 | 8/2011 | Rasmussen | |
| 8,265,345 B2 | 9/2012 | Gotoh | |
| 8,374,792 B2 | 2/2013 | White | |
| 10,345,108 B2 | 7/2019 | Freed | |

(Continued)

*Primary Examiner* — Isaac G Smith
(74) *Attorney, Agent, or Firm* — Faegre Drinker Biddle & Reath LLP

(57) ABSTRACT

A computer-implemented system and method distilling three-dimensional structure to a two-dimensional raster with multiple discrete planes for purposes of safe and accurate route planning including a map generator, pixel encoder, map transformer, and route generator. The map generator generates a raster map by populating a blank map canvas with raster and vector data on a per-pixel basis and obtains values for pixels from the pixel encoder. The pixel encoder encodes type, plane, and elevator information of features into pixels. The map transformer converts the map produced by the map generator into a weighted graph of nodes and edges suitable for route generation. The route generator generates routes using the graph produced by the map transformer.

20 Claims, 16 Drawing Sheets

(56) References Cited

U.S. PATENT DOCUMENTS

| | | |
|---|---|---|
| 2002/0042670 A1 | 4/2002 | Diaz |
| 2007/0229506 A1 | 10/2007 | Sugita |
| 2007/0288480 A1 | 12/2007 | Caplan |
| 2010/0094485 A1* | 4/2010 | Verlut .................. G06Q 10/047 |
| | | 701/3 |
| 2012/0029804 A1* | 2/2012 | White ..................... G01C 21/20 |
| | | 701/455 |
| 2012/0278505 A1* | 11/2012 | Hardt ..................... G01C 21/32 |
| | | 709/246 |

\* cited by examiner

| G0 | G1 | B0 | B1 | T0 | T1 | E0 | E1 |

300

If the input pixel is on the ground, set G0 and G1 to indicate the type.
302

↓

If the input pixel is on a bridge, set B0 and B1 to indicate the type.
306

↓

If the input pixel is in a tunnel, set T0 and T1 to indicate the type.
310

↓

If the input pixel is at a bridge or tunnel endpoint, set E0 and E1 to indicate this.
314

| G0, G1 | Type |
|---|---|
| 00 | Grass |
| 01 | Trail |
| 10 | Road |
| 11 | Trail + road |

304

| B0, B1 | Type |
|---|---|
| 00 | None |
| 01 | Trail |
| 10 | Road |
| 11 | Trail + road |

308

| T0, T1 | Type |
|---|---|
| 00 | None |
| 01 | Trail |
| 10 | Road |
| 11 | Trail + road |

312

| E0, E1 | Type |
|---|---|
| 00 | None |
| 01 | Up |
| 10 | Down |
| 11 | Up + down |

| G0 | G1 | G2 | G3 | B0 | T0 | E0 | E1 |

318

If the input pixel is on the ground, set G0, G1, G2, and G3 to indicate the type.
320

| G0, G1, G2, G3 | Type |
|---|---|
| 0000 | Grass |
| 0001 | Trail |
| 0010 | Road |
| 0011 | Trail + road |

322

If the input pixel is on a bridge, set B0.
324

| B0 | Type |
|---|---|
| 0 | None |
| 1 | Bridge |

326

If the input pixel is in a tunnel, set T0.
328

| T0 | Type |
|---|---|
| 0 | None |
| 1 | Tunnel |

330

If the input pixel is at a bridge or tunnel endpoint, set E0 and E1 to indicate this.
332

| E0, E1 | Type |
|---|---|
| 00 | None |
| 01 | Up |
| 10 | Down |
| 11 | Up + down |

| G | G | G | G | G |
|---|---|---|---|---|
| G | G | GTD | G | G |
| G | GBU | GBT | GBU | G |
| G | G | GTD | G | G |
| G | G | G | G | G |

430

| G | Grass |
|---|---|
| B | Bridge |
| T | Tunnel |
| U | Up |
| D | Down |

432

G

| 0 | 0 | 0 | 0 | 0 | 0 | 0 | 0 |
|---|---|---|---|---|---|---|---|

434

| 0 | 0 | 0 | 0 | 0 | 0 | 0 | 0 |
|---|---|---|---|---|---|---|---|

436

GTD

| 0 | 0 | 0 | 0 | 0 | 1 | 1 | 0 |
|---|---|---|---|---|---|---|---|

438

| 0 | 0 | 0 | 0 | 0 | 1 | 1 | 0 |
|---|---|---|---|---|---|---|---|

440

GBU

| 0 | 0 | 1 | 0 | 0 | 0 | 0 | 1 |
|---|---|---|---|---|---|---|---|

442

| 0 | 0 | 0 | 0 | 1 | 0 | 0 | 1 |
|---|---|---|---|---|---|---|---|

444

GBT

| 0 | 0 | 1 | 0 | 0 | 1 | 0 | 0 |
|---|---|---|---|---|---|---|---|

446

| 0 | 0 | 0 | 0 | 1 | 1 | 0 | 0 |
|---|---|---|---|---|---|---|---|

448

GB

| 0 | 0 | 1 | 0 | 0 | 0 | 0 | 0 |
|---|---|---|---|---|---|---|---|

450

| 0 | 0 | 0 | 0 | 1 | 0 | 0 | 0 |
|---|---|---|---|---|---|---|---|

| G | G | G | G | G |
|---|---|---|---|---|
| G | G | GTD | G | G |
| G | GBU | GBT | GBU | G |
| G | G | GTD | G | G |
| G | G | G | G | G |

| Pixel | Bit Encoding |
|---|---|
| 1  | 0 0 0 0 0 0 0 0 |
| 2  | 0 0 0 0 0 0 0 0 |
| 3  | 0 0 0 0 0 0 0 0 |
| 4  | 0 0 0 0 0 0 0 0 |
| 5  | 0 0 0 0 0 0 0 0 |
| 6  | 0 0 0 0 0 0 0 0 |
| 7  | 0 0 0 0 0 0 0 0 |
| 8  | 0 0 0 0 0 1 1 0 |
| 9  | 0 0 0 0 0 0 0 0 |
| 10 | 0 0 0 0 0 0 0 0 |
| 11 | 0 0 0 0 0 0 0 0 |
| 12 | 0 0 1 0 0 0 0 1 |
| 13 | 0 0 1 0 0 1 0 0 |
| 14 | 0 0 1 0 0 0 0 1 |
| 15 | 0 0 0 0 0 0 0 0 |
| 16 | 0 0 0 0 0 0 0 0 |
| 17 | 0 0 0 0 0 0 0 0 |
| 18 | 0 0 0 0 0 1 1 0 |
| 19 | 0 0 0 0 0 0 0 0 |
| 20 | 0 0 0 0 0 0 0 0 |
| 21 | 0 0 0 0 0 0 0 0 |
| 22 | 0 0 0 0 0 0 0 0 |
| 23 | 0 0 0 0 0 0 0 0 |
| 24 | 0 0 0 0 0 0 0 0 |
| 25 | 0 0 0 0 0 0 0 0 |

602

| Pixel | Bit Encoding |
|---|---|
| 1  | 0 0 0 0 0 0 0 0 |
| 2  | 0 0 0 0 0 0 0 0 |
| 3  | 0 0 0 0 0 0 0 0 |
| 4  | 0 0 0 0 0 0 0 0 |
| 5  | 0 0 0 0 0 0 0 0 |
| 6  | 0 0 0 0 0 0 0 0 |
| 7  | 0 0 0 0 0 0 0 0 |
| 8  | 0 0 0 0 0 1 1 0 |
| 9  | 0 0 0 0 0 0 0 0 |
| 10 | 0 0 0 0 0 0 0 0 |
| 11 | 0 0 0 0 0 0 0 0 |
| 12 | 0 0 0 0 1 0 0 1 |
| 13 | 0 0 0 0 1 1 0 0 |
| 14 | 0 0 0 0 1 0 0 1 |
| 15 | 0 0 0 0 0 0 0 0 |
| 16 | 0 0 0 0 0 0 0 0 |
| 17 | 0 0 0 0 0 0 0 0 |
| 18 | 0 0 0 0 0 1 1 0 |
| 19 | 0 0 0 0 0 0 0 0 |
| 20 | 0 0 0 0 0 0 0 0 |
| 21 | 0 0 0 0 0 0 0 0 |
| 22 | 0 0 0 0 0 0 0 0 |
| 23 | 0 0 0 0 0 0 0 0 |
| 24 | 0 0 0 0 0 0 0 0 |
| 25 | 0 0 0 0 0 0 0 0 |

| Node | Plane | Type |
|---|---|---|
| 1 | Ground | Grass |
| 2 | Ground | Grass |
| 3 | Ground | Grass |
| 4 | Ground | Grass |
| 5 | Ground | Grass |
| 6 | Ground | Grass |
| 7 | Ground | Grass |
| 8 | Ground | Grass |
| 9 | Tunnel | Trail |
| 10 | Ground | Grass |
| 11 | Ground | Grass |
| 12 | Ground | Grass |
| 13 | Ground | Grass |
| 14 | Bridge | Road |
| 15 | Ground | Grass |
| 16 | Bridge | Road |
| 17 | Tunnel | Trail |
| 18 | Ground | Grass |
| 19 | Bridge | Road |
| 20 | Ground | Grass |
| 21 | Ground | Grass |
| 22 | Ground | Grass |
| 23 | Ground | Grass |
| 24 | Tunnel | Trail |
| 25 | Ground | Grass |
| 26 | Ground | Grass |
| 27 | Ground | Grass |
| 28 | Ground | Grass |
| 29 | Ground | Grass |
| 30 | Ground | Grass |
| 31 | Ground | Grass |

606

| Node | Plane | Type |
|---|---|---|
| 1 | Ground | Grass |
| 2 | Ground | Grass |
| 3 | Ground | Grass |
| 4 | Ground | Grass |
| 5 | Ground | Grass |
| 6 | Ground | Grass |
| 7 | Ground | Grass |
| 8 | Ground | Grass |
| 9 | Tunnel | |
| 10 | Ground | Grass |
| 11 | Ground | Grass |
| 12 | Ground | Grass |
| 13 | Ground | Grass |
| 14 | Bridge | |
| 15 | Ground | Grass |
| 16 | Bridge | |
| 17 | Tunnel | |
| 18 | Ground | Grass |
| 19 | Bridge | |
| 20 | Ground | Grass |
| 21 | Ground | Grass |
| 22 | Ground | Grass |
| 23 | Ground | Grass |
| 24 | Tunnel | |
| 25 | Ground | Grass |
| 26 | Ground | Grass |
| 27 | Ground | Grass |
| 28 | Ground | Grass |
| 29 | Ground | Grass |
| 30 | Ground | Grass |
| 31 | Ground | Grass |

| Node | Adjacencies |
|---|---|
| 1 | 2,6,7 |
| 2 | 1,3,6,7,8 |
| 3 | 2,4,7,8,10 |
| 4 | 3,5,8,10,11 |
| 5 | 4,10,11 |
| 6 | 1,2,7,12,13 |
| 7 | 1,2,3,6,8,12,13,15 |
| 8 | 2,3,4,7,9,10,13,15,18 |
| 9 | 8,17 |
| 10 | 3,4,5,8,11,15,18,20 |
| 11 | 4,5,10,18,20 |
| 12 | 6,7,13,21,22 |
| 13 | 6,7,8,12,14,15,21,22,23 |
| 14 | 13,16 |
| 15 | 7,8,10,13,18,22,23,25 |
| 16 | 14,19 |
| 17 | 9,24 |
| 18 | 8,10,11,15,19,20,23,25,26 |
| 19 | 16,18 |
| 20 | 10,11,18,25,26 |
| 21 | 12,13,22,27,28 |
| 22 | 12,13,15,21,23,27,28,29 |
| 23 | 13,15,18,21,24,25,28,29,30 |
| 24 | 17,23 |
| 25 | 15,18,20,23,26,29,30,31 |
| 26 | 18,20,25,30,31 |
| 27 | 21,22,28 |
| 28 | 21,22,23,27,29 |
| 29 | 22,23,25,28,30 |
| 30 | 23,25,26,29,31 |
| 31 | 25,26,30 |

| | |
|---|---|
| B | Bridge |
| T | Tunnel |
| S | Start |
| E | End |

700

702

704

706

SYSTEM AND METHOD FOR MULTI-PLANE ROUTING

CROSS-REFERENCE TO RELATED APPLICATIONS

The present application is a continuation of U.S. patent application Ser. No. 13/472,866, filed May 16, 2012, the complete disclosure of which is expressly incorporated there.

FIELD OF THE INVENTION

The present invention is directed toward the field of route planning, and more specifically toward distilling three-dimensional structure to a two-dimensional raster with multiple discrete planes for purposes of safe and accurate route planning.

DISCUSSION OF THE BACKGROUND

A route planning system finds an optimal route by searching a weighted graph. The two types of route planning systems are vector-based and raster-based.

In a vector-based route planning system, the weighted graph's edges are explicitly defined by an input vector dataset. Vehicle navigation is a typical application of a vector-based route planning system. Vehicle movement is constrained to road networks, which are sparse when compared to the environment. Thus, typical vector-based route planning systems utilize a sparse weighted graph representation which allows for linear movement along roads. This sparse graph representation is built from a vector map dataset, wherein road intersections are represented by nodes, and connections between intersections are represented by edges. Such a graph representation easily and naturally models the topology of terrain exhibiting discrete interconnected lines of movement, examples including bridges over roads and more complex highway interchange systems. In addition, because the terrain being modeled is relatively sparse, its vector representation will often employ less digital storage space than its raster representation.

In a raster-based route planning system, the weighted graph's edges are implicitly defined between each pair of adjacent grid cells. Pedestrian navigation is a typical application of a raster-based route planning system. Relative to vehicle movement, pedestrian movement is less constrained by the environment. Thus, typical raster-based route planning systems utilize a dense graph representation which allows for 360-degree movement. This dense graph representation is built from raster map dataset, wherein the environment is partitioned into regular grid cells of arbitrarily small size. The centers of each grid cell represent nodes, and adjacent pairs of grid cells represent edges. Such a graph representation easily and naturally models terrain exhibiting a single plane of movement, examples including open fields and parking lots. Because the environment is dense, its raster representation will often employ less digital storage than its vector representation. Thus, raster datasets are the most natural representation of the environment.

In reality, it is sometimes desirable for a route planning system to relax constraints on vehicle movement. For example, in a military situation, a vehicle route may travel along a road and suddenly abandon that road to cross an open field and gain time. Also, it is sometimes desirable for a route planning system to tighten constraints on pedestrian movement. For example, in an urban area, a pedestrian route crossing a footbridge over a highway should be constrained to moving along the footbridge until reaching one of the endpoints so as to avoid directing the user to jump off the footbridge.

Furthermore, certain scenarios warrant a route planning system performing mixed navigation (i.e., simultaneous vehicle and pedestrian navigation). For example, a Soldier en route to an assault objective needs vehicle navigation during convoy movement and pedestrian navigation during dismounted movement. A geocacher needs vehicle navigation during road travel to a state park and pedestrian navigation while hunting for the cache location on foot. A deer hunter needs vehicle navigation while driving the truck to the hunting grounds pedestrian navigation while making the hike to the deer stand deep in the woods.

Unfortunately, existing route planning systems accommodate either the vehicle component or the pedestrian component of these scenarios, but not both. Exemplary embodiments of a vehicle route planning system are U.S. Pat. No. 5,041,983 ("Method and apparatus for searching for route") to Nakahara et. al. and U.S. Pat. No. 5,168,452 ("Route exploration method of navigation apparatus") to Yamada et. al. These systems and others like them are inflexible and fail to relax movement constraints necessary for generating useful pedestrian routes. Exemplary embodiments of a pedestrian route planning system are U.S. Pat. No. 6,963,800 ("Routing soldiers around enemy attacks and battlefield obstructions") and U.S. Pat. No. 7,756,635 ("Method and System for Generating and Presenting Off-Road Travel Routes") to Milbert. These systems and others like them are occasionally suboptimal and fail to tighten movement constraints necessary for generating safe and passable pedestrian routes.

SUMMARY OF THE INVENTION

Therefore, there is a need for a method and system that addresses the above and other problems. The above and other problems are addressed by the exemplary embodiments of the present invention, which generates routes that correctly utilize three-dimensional structures.

Accordingly, in exemplary aspects of the present invention there is provided a computer-implemented system and method for generates routes that correctly utilize three-dimensional structures. Thus, the invention includes a Map Generator for generating raster maps, a Pixel Encoder for encoding pixels, a Map Transformer for generating routable graphs, and a Route Generator for generating routes.

The Map Generator generates a raster map by populating a blank map canvas with raster and vector data on a per-pixel basis. The Map Generator obtains values for pixels from the Pixel Encoder.

The Pixel Encoder encodes type, plane, and elevator information of features into pixels.

The Map Transformer converts the map produced by the Map Generator into a weighted graph of nodes and edges suitable for route generation.

The Route Generator generates routes using the graph produced by the Map Transformer.

Advantageously, the exemplary embodiments include various features that are of particular utility, for example, including generating a route that can freely switch between on-road and off-road terrain to provide the most efficient route possible. These advantages are possible due to the employment of a raster-based map instead of a vector-based map, since the raster-based map allows for both on- and off-road travel. Furthermore, a raster-based map consumes far less space on disk than does the vector-based equivalent.

Adoption of a raster-based map usually comes with certain disadvantages related to decreased traveler safety and decreased route accuracy. Advantageously, the exemplary embodiments overcome these safety and accuracy disadvantages by correctly accounting for the fact that features like bridges and tunnels exist on a physically discrete plane from the ground and are accessible only via endpoints. Because of this, the exemplary embodiments generate routes that direct travelers to the endpoints of a bridge rather than suggesting the traveler jump off somewhere in the middle. In addition, the exemplary embodiments generate routes that direct travelers to the endpoints of a tunnel rather than directing the traveler to an area above the tunnel, which wastes time and decreases route accuracy.

In addition, the exemplary embodiments allow for greater flexibility when assigning relative preferences to terrain types when routing. As an example, consider a typical sidewalk that crosses a residential road, a terrain feature that can be found thousands of times over in the United States alone. Generally, vehicles are allowed to use roads and not sidewalks, and pedestrians are allowed to use sidewalks and not roads. Unfortunately, traditional raster-based routing systems cannot fully accommodate these simple preferences. First, a traditional raster map must choose the order in which features are rendered. In this example, there are two feature types, road and sidewalk, and thus there are two possibilities as to the rendering order:

1. The road pixels are rendered atop the sidewalk, resulting in the road dividing the sidewalk.
2. The sidewalk pixels are rendered atop the road, resulting in the sidewalk dividing the road.

Second, the routing system must assign a relative preference to each feature type. In this example, there are four possibilities as to the configuration of preferences:

1. Allow travel on the sidewalk and disallow travel on the road.
2. Allow travel on the sidewalk and allow travel on the road.
3. Disallow travel on the sidewalk and allow travel on the road.
4. Disallow travel on the sidewalk and disallow travel on the road (does not make sense).

There exists no configuration of rendering order and preferences that suits route generation for both vehicles and pedestrians. Consider option 1 for rendering order. Here are the problems that arise with each preference configuration (ignoring the fourth option because it is nonsensical):

1. Pedestrian routes cannot cross roads.
2. Pedestrian routes are free to use all roads (not desirable).
3. Pedestrian routes may use only roads and no sidewalks (not desirable).

Now consider the with preferences that arise after option 2 for rendering order is selected:

1. Vehicle routes may use only sidewalks and no roads (not desirable).
2. Vehicle routes are free to use all sidewalks (not desirable).
3. Vehicle routes cannot cross sidewalks.

Still other aspects, features, and advantages are readily apparent from the following detailed description, by illustrating a number of exemplary embodiments and implementations. The present invention is also capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The embodiments of the present invention are illustrated by way of example, and not by way of limitation, in the figures of the accompanying drawings in which like reference numerals refer to similar elements and in which:

FIGS. 3A and 3B illustrate Pixel Encoder Flowcharts.
FIGS. 4A and 4B illustrate Map Generator/Pixel Encoder Examples.
FIGS. 6A, 6B, 6C, 6D, and 6E illustrate Map Transformer Examples.

DETAILED DESCRIPTION OF THE EXEMPLARY EMBODIMENTS

Figure 1:
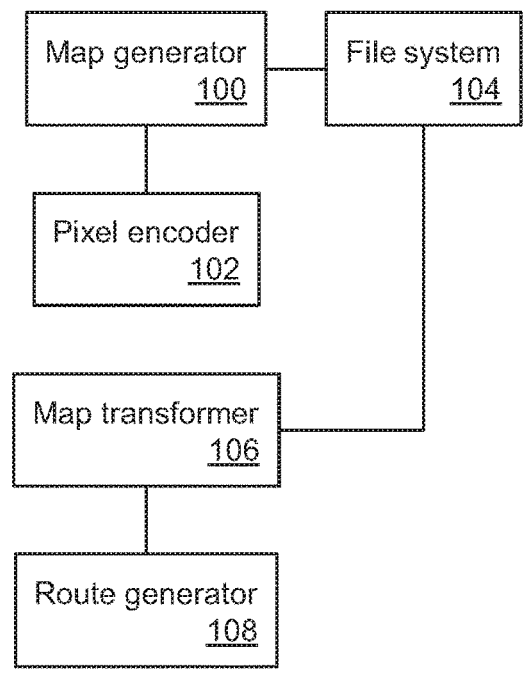
FIG. 1 illustrates an Overall System.

FIG. 1 shows an exemplary embodiment of the present invention. The map generator 100 uses the pixel encoder 102 to convert input raster and vector map data into an encoded multi-plane raster map and store it in the file system 104. Typical input raster data includes land cover data from the National Land Cover Dataset (NLCD) or Geo Cover Land Cover (GCLC). These are typically stored in GeoTiff (*.tif) format. Typical input vector data includes buildings, roads, trails, trees, walls, and water data from Navteq, OpenStreetMap, or Tele Atlas. These are typically stored in Shapefile (*.shp) or Keyhole Markup Language (*.kml) format.

When a user requests a route, the route generator 108 uses the map transformer 106 to read the encoded raster from the file system 104 and convert it into a graph suitable for routing. The route generator 108 uses this graph plus the well-known A* algorithm (see pages 93 to 99 of "Artificial Intelligence: A Modern Approach, Third Edition" by Stuart Russell and Peter Norvig) to plan a route. One skilled in the art will recognize that the present invention applies to many path finding algorithms-not just A*. Other planning algorithms include greedy best-first search, iterative deepening A* (IDA*), recursive best-first search (RBFS), memory-bounded A* (MA*), simple memory-bounded A* (SMA*), anytime repairable A* (ARA*), and anytime D*.

In addition, the present invention is applicable to problem domains other than route generation. For example, the encoded multi-plane raster map could support a three-dimensional terrain visualization system depicting geographic features such as bridges (especially the empty area beneath bridges) with greater accuracy than is currently possible. Also, the encoded multi-plane raster map could support a geographic information systems system accurately measuring lengths and perimeters of geographic features (such as roads and trails) without having to maintain a large vector dataset.

Figure 2A:
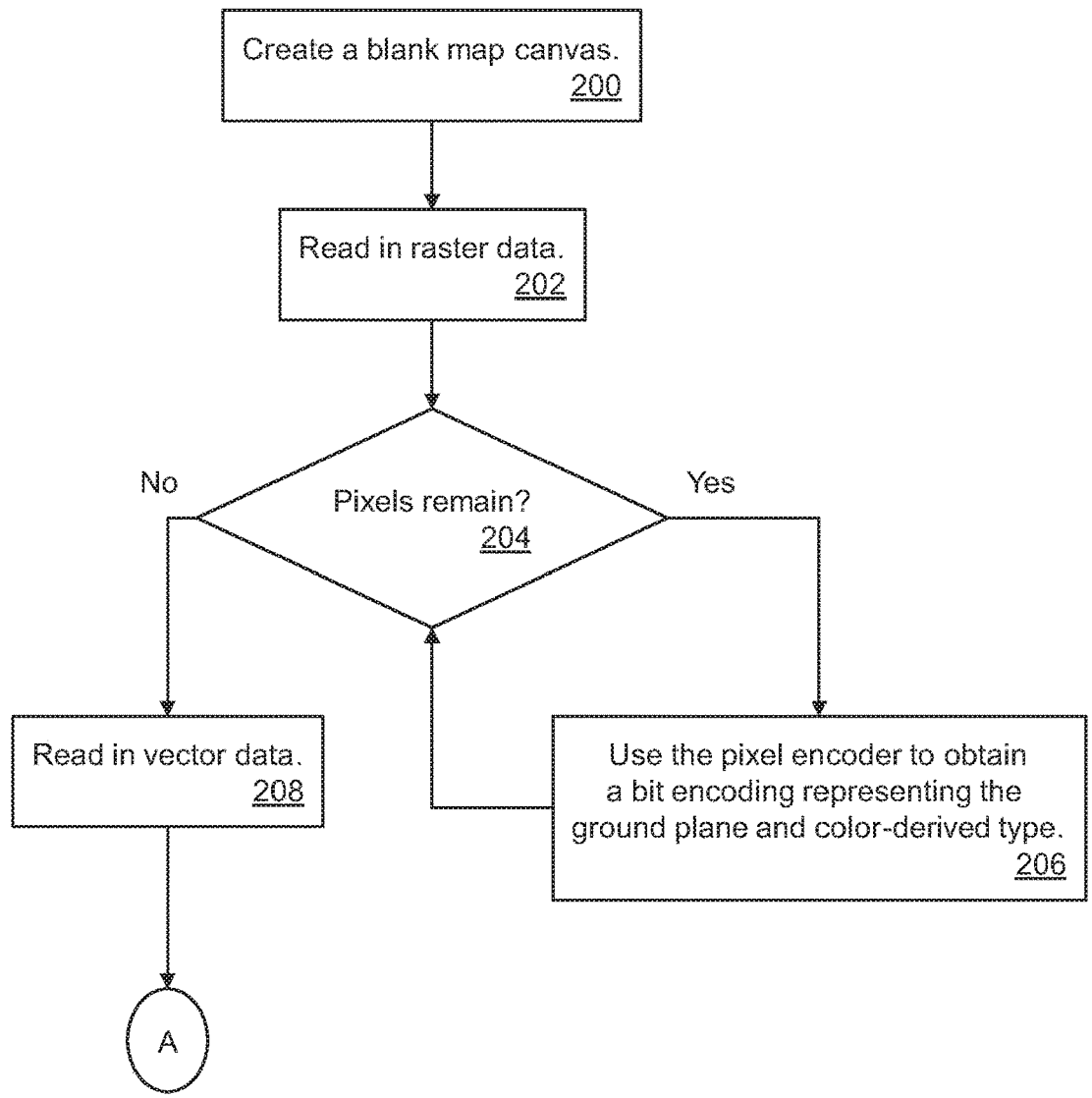
FIGS. 2A and 2B illustrate Map Generator Flowcharts.
Figure 2B:
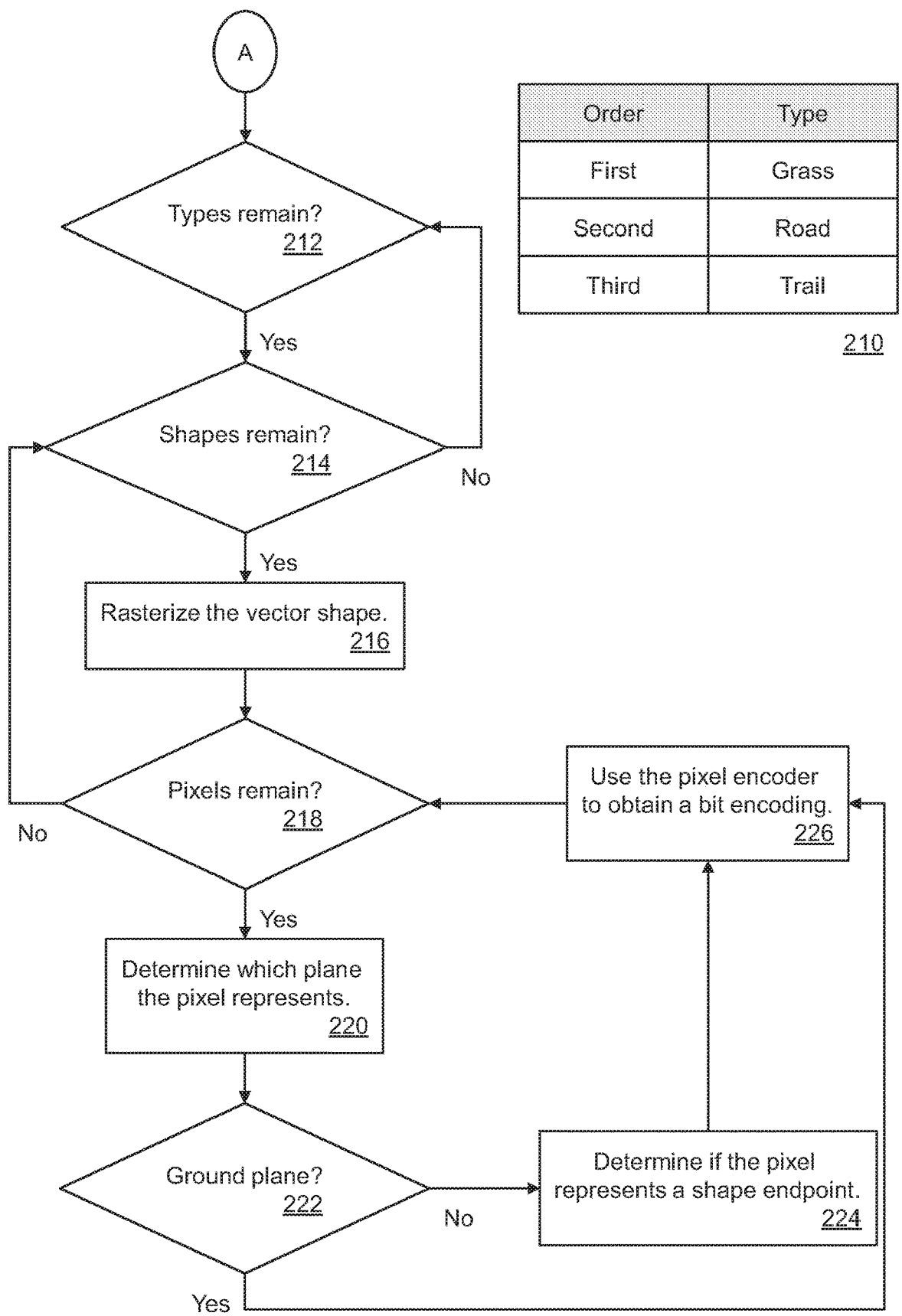

FIG. 2A and FIG. 28 show an exemplary embodiment of the map generator 100, which outputs an encoded raster map.

At step 200 the map generator 100 creates a blank map canvas for storing the encoded multi-plane raster. The map canvas has a geographic extent sufficient to enclose the input raster and vector map data. It also has a user-specified resolution (e.g. 5 meters per pixel).

At step 202 the map generator 100 reads in raster data if it is specified by the user. If raster data is not specified, the map generator 100 creates an input raster and populates its pixels with a default color.

At step 204 the map generator 100 determines whether there are pixels remaining in the input raster. If so, the map generator 100 proceeds to step 206. Otherwise, the map generator 100 proceeds to step 204.

At step 206 the map generator 100 gets the next pixel and uses the pixel encoder 102 to encode the corresponding pixel in the output map raster. The map generator 100 then returns to step 204.

Eventually the map generator 100 finishes iterating through the pixels of the input raster, exits step 204, and proceeds to step 208.

At step 208 the map generator 100 reads in the vector data. The map generator 100 then determines the vector data type of each shape by inspecting the shape's attributes (key-value pairs). The map generator 100 queries the attributes for an entry with name equal to "Type". If such an attribute exists, the map generator 100 derives the vector data type from the attribute's value. Otherwise, the map generator 100 determines that the vector data type is grass. The vector data is contained in the Keyhole Markup Language (KML) format which is available on the World Wide Web at developers.google.com/kml/documentation/kmlreference. The KML file or files containing the vector data to be processed by the map generator 100 are passed as arguments by the user. Those skilled in the art will realize that a variety of vector data file formats would be suitable alternatives to KML, including the ESRI Shapefile format which is available on the World Wide Web at esri.com/library/whitepapers/pdfs/shapefile.pdf.

At step 212 the map generator 100 determines if any unprocessed vector data types remain. If so, the map generator 100 selects the next unprocessed vector data type according to the order specified in table 210 and then proceeds to step 214. Otherwise, the map generator 100 exits.

At step 214 the map generator 100 determines if any unprocessed vector data shapes of the type selected in step 212 remain. If so, the map generator 100 selects the next unprocessed vector data shape and proceeds to step 216. Otherwise, the map generator 100 returns to step 212.

At step 216 the map generator 100 rasterizes the vector data shape, which entails determining a subset of pixels of the map canvas created in step 200 that overlap the vector data shape.

At step 218 the map generator 100 determines if any unprocessed pixels remain from the pixels determined in step 216. If so, the map generator 100 proceeds to step 220. Otherwise, the map generator 100 returns to step 214.

At step 220 the map generator 100 determines which plane the pixel represents. The map generator 100 makes this determination by inspecting the shape attributes (key-value pairs). First, the map generator 100 queries the attributes for an entry with name equal to "Bridge" and value equal to "True". If such an attribute exists, the map generator 100 determines that the pixel represents the bridge plane. Otherwise, the map generator 100 queries the attributes for an entry with name equal to "Tunnel" and value equal to "True". If such an attribute exists, the map generator 100 determines that the pixel represents the tunnel plane. Otherwise, the map generator 100 determines that the pixel represents the ground plane. The concepts behind vector map data attributes, and the manner in which the map generator 100 employs them in step 220, will be familiar to those skilled in the art.

At step 222, the map generator determines if the pixel represents the ground plane. If so, the map generator proceeds to step 226. Otherwise, the map generator 100 proceeds to step 224.

At step 224, the map generator 100 determines if the pixel represents a shape endpoint. The map generator 100 makes this determination by assessing the current pixel in the content of the rasterized shape and comparing its position to the positions of the vector data shape's endpoints.

At step 226, the map generator 100 uses the pixel encoder 102 to obtain a bit encoding for the pixel. The map generator 100 supplies the pixel encoder 102 with the pixel plane, type, and endpoint information employed. The map generator 100 then returns to step 218.

FIG. 3A and FIG. 38 show exemplary embodiments of the pixel encoder 102. The input is a pixel consisting of a field indicating which 20 coordinate plane the pixel occupies, a field indicating the type (category) of land cover the pixel represents, and a field indicating whether or not the pixel represents an endpoint of a vector shape. The output is a bit encoding representing the input pixel.

The bit encoding scheme of embodiment A of the pixel encoder 102 uses 8 bits per pixel. Of these, embodiment A allocates 2 bits for representing a type on a first plane, 2 bits for representing a type on a second plane, 2 bits for representing a type on a third plane, and 2 bits for representing a connection from the first plane to the second, or the first plane to the third, or the first plane to both the second and third. Thus, each pixel encoded by embodiment A of the pixel encoder 102 can assume any of 4 possible types and any of 3 possible planes.

The bit encoding scheme of embodiment B of the pixel encoder 102 also uses 8 bits per pixel. Of these, embodiment B allocates 4 bits for representing a type on a first plane, 1 bit for representing the presence of data on second plane, 1 bit for representing the presence of data on a third plane, and 2 bits for representing a connection from the first plane to the second, or the first plane to the third, or the first plane to both the second and third. Thus, each pixel encoded by embodiment B of the pixel encoder 102 can assume any of 16 possible types and any of 3 possible planes.

Notice that embodiment B has a seemingly superior bit encoding scheme to embodiment A; embodiment B can represent the same number of planes (3) but quadruple the number of types (16 versus 4). However, also notice that embodiment B allocates a single bit for representing the presence of data on the second and third planes. Embodiment B uses this single bit simply to determine whether the second plane, third plane, or both, have data present, but embodiment B cannot use the bit to determine which of the 16 types the pixel represents. Thus, embodiment B must perform a non-trivial extra step wherein the type of pixels on the second and third planes is determined from a 4 type bits of a pixel that connects the first plane with the plane in question.

Those skilled in the art will recognize that the bit encoding schemes of embodiments A and B lie somewhere in the middle of a spectrum of bit encoding schemes along which the maximum number of representable types and planes varies greatly.

At one extreme end of the spectrum lies a theoretical embodiment C which maximizes the number of representable types by sacrificing the number of representable planes. Thus, in the theoretical embodiment C, the entire bit sequence represents a type on a single plane, and no bits remain for representing any alternate planes. For example, if embodiment C used 8 bits per pixel, then it could represent at most 28=256 types, because there are 256 ways to configure a sequence of 8 bits. Since no bits are used to represent planes, it is implied that there exists a single plane. Embodiment C might be useful in a terrain analysis system for geologists that represents dozens or hundreds of soil and vegetation characteristics. Conventional raster-based route planning systems naively utilize this end of the spectrum, mostly because it is unobvious how one might tradeoff types for planes, but also because the benefits of doing so are unobvious.

At the other extreme end of the spectrum lies a theoretical embodiment D which maximizes the number of representable planes by sacrificing the number of representable types. Thus, in the theoretical embodiment D, each individual bit represents a discrete plane and a type, and no bits remain for representing any alternate types or plane inter-connections. For example, if embodiment D used 8 bits per pixel, then it could represent a maximum of 8 planes, one bit for each plane, and a maximum of 2 types (21=2). Embodiment D might be useful in an integrated circuit layout application that must represent many layers in a circuit board but only 2 types on the layer (wire or no wire).

In addition to the varieties of embodiments of the pixel encoder 102 outlines above, those skilled in the art will recognize that in yet another embodiment, the number of bits per pixel could be varied; more bits per pixel enables more information to be encoded per pixel, which would enable representation of a greater or fewer number of planes, or a greater or fewer number of types, or some combination of both. However, these benefits would come at a performance cost: greater memory consumption, longer disk read times, higher transfer latencies and bandwidths, greater power consumption, etc. For these reasons, an embodiment of the present invention on a handheld computing device might use choose fewer bits per pixel, whereas an embodiment on a web server might use more. In yet another embodiment, the number of bits allocated for representing types on each plane need not be equal (as exemplified by embodiment B).

FIG. 3A shows exemplary embodiment of the pixel encoder 102 without flood fill (embodiment A). Diagram 300 shows the bit encoding. Each pixel consumes 8 bits. Bits G0 and G1 encode the ground plane's type. Bits B0 and B1 encode a bridge plane's type. Bits T0 and T1 encode a tunnel plane's type. Bits E0 and E1 encode elevators where one may move from one plane to another.

Embodiment A of the pixel encoder 102 starts with bit encoding 300 with each bit initialized to a default value of 0.

At step 302 the pixel encoder 102 determines if the input pixel represents the ground plane. If so, it uses table 304 to set G0 and G1 in the output map raster.

At step 306 the pixel encoder 102 determines if the input pixel represents the bridge plane. If so, it uses table 308 to set B0 and B1 in the output map raster.

At step 310 the pixel encoder 102 determines if the input pixel represents the tunnel plane. If so, it uses table 312 to set T0 and T1 in the output map raster.

At step 314 the pixel encoder 102 determines if the input pixel is at the endpoint of a shape on the bridge or tunnel plane. If so, it uses table 316 to set E0 and E1 in the output map raster, using the Up type for a pixel at a bridge endpoint, the Down type for a pixel at a tunnel endpoint, and the Up+down type for a pixel at both a bridge and tunnel endpoint.

FIG. 3B shows exemplary embodiment of the pixel encoder 102 with flood fill (embodiment B). Diagram 318 shows the bit encoding. Each pixel consumes 8 bits. Bits G0 through G3 encode the ground plane's type. Bit B0 indicates the presence or absence of a bridge plane at a given location. Bit T0 indicates the presence or absence of a tunnel plane at a given location. Bits E0 and E1 encode elevators where one may move from one plane to another.

Embodiment B of the pixel encoder 102 starts with bit encoding 318 with each bit initialized to a default value of 0.

At step 320 the pixel encoder 102 determines if the input pixel represents the ground plane. If so, it uses table 322 to set G0 through G3 in the output map raster.

At step 324 the pixel encoder 102 determines if the input pixel represents the bridge plane. If so, it uses table 326 to set B0 in the output map raster.

At step 328 the pixel encoder 102 determines if the input represents the tunnel plane. If so, it uses table 330 to set T0 in the output map raster.

At step 332 the pixel encoder 102 determines if the input pixel is at the endpoint of a shape on the bridge or tunnel plane. If so, it uses table 334 to set E0 and E1 in the output map raster, using the Up type for a pixel at a bridge endpoint, the Down type for a pixel at a tunnel endpoint, and the Up+down type for a pixel at both a bridge and tunnel endpoint.

Figure 4A:
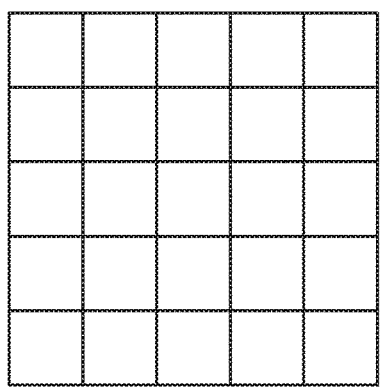
Figure 4A:
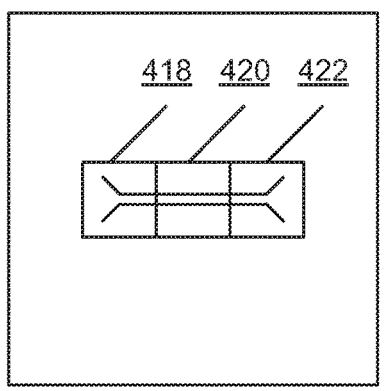
Figure 4A:
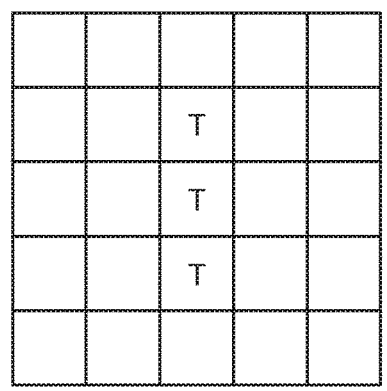
Figure 4A:
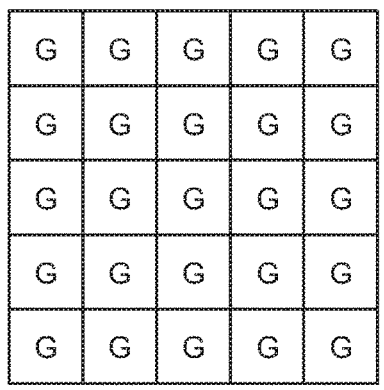
Figure 4A:
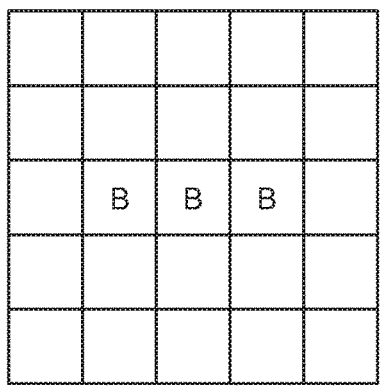
Figure 4A:
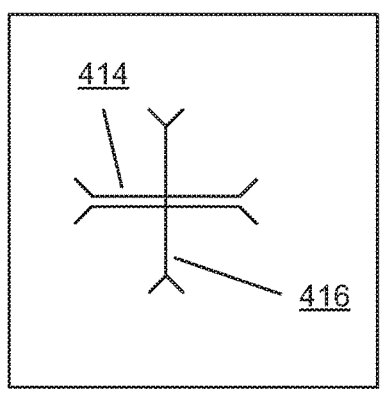
Figure 4A:
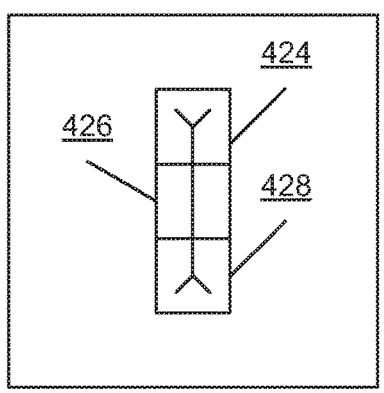

FIG. 4A and FIG. 4B provide an example of using the map generator 100 and pixel encoder 102.

At step 200 the map generator 100 creates a blank map canvas 400. In this case, the blank map canvas 400 is a five by five pixel grid whose pixels each comprise 8 bits, all of which are initially unset.

At step 202 the map generator 100 reads in the raster data 402 since it has been specified by the user. In this case, the raster data 402 is a five by five grid whose pixels all have a color representing grass.

At step 204 the map generator 100 iterates through each pixel the raster data 402.

At step 206 the map generator 100 uses the pixel encoder 102 to obtain a bit encoding for each pixel in the raster data 402, specifying the ground plane and grass type (derived from the pixel color).

Embodiment A of the pixel encoder 102 starts at step 302 by determining that the input pixel represents the ground plane and setting G0 and G1 to 00 per table 304 to indicate the grass type.

At step 306 the pixel encoder 102 determines that the input pixel does not represent the bridge plane and does not modify B0 and B1.

At step 310 the pixel encoder 102 determines that the input pixel does not represent the tunnel plane and does not modify T0 and T1.

At step 314 the pixel encoder 102 determines that the input pixel does not represent a bridge or tunnel endpoint and does not modify E0 and E1. The result is the bit encoding 434.

Embodiment B of the pixel encoder 102 starts at step 320 by determining that the input pixel represents the ground plane and setting G0 to G3 to 0000 per table 322 to indicate the grass type.

At step 324 the pixel encoder 102 determines that the input pixel does not represent the bridge plane and does not modify B0.

At step 328 the pixel encoder 102 determines that the input pixel does not represent the tunnel plane and does not modify T0.

At step 332 the pixel encoder 102 determines that the input pixel does not represent a bridge or tunnel endpoint and does not modify E0 and E1. The result is the bit encoding 436.

After encoding all of the pixels in the raster data 402, the map generator 100 proceeds to step 208.

At step 208 the map generator 100 reads in the vector data 404. In this case, vector data 404 comprises a single KML file. The map generator 100 discovers two shapes, shape 414 and shape 416. The map generator 100 queries the "Type" attribute of shape 414 and determines the value is "Road". The map generator 100 queries the "Type" attribute of shape 416 and determines the value is "Trail".

At step 212 the map generator 100 determines that unprocessed vector data types remain, and selects the "Road" vector data type from table 210.

At step 214 the map generator 100 determines that unprocessed vector data shapes of type "Road" remain, and selects shape 414.

At step 216 the map generator 100 rasterizes shape 414 to raster 406 having non-empty pixels 418, 420, and 422.

At step 218 the map generator 100 determines that unprocessed pixels remain from raster 406 and selects pixel 418.

At step 220 the map generator 100 determines that pixel 418 represents the bridge plane. This determination is made by assessing the value of the "Bridge" attribute; in this case, the value is "True".

At step 222 the map generator 100 determines that pixel 418 does not represent the ground plane, and proceeds to step 224.

At step 224, the map generator 100 determines that, because the position of pixel 418 closely corresponds to the position of one of the endpoints of the road shape 414, pixel 418 represents a shape endpoint.

At step 226 the map generator 100 uses the pixel encoder 102 to obtain a bit encoding for pixel 418, specifying the bridge plane and road type and affirming that the pixel represents a shape endpoint.

Embodiment A of the pixel encoder 102 starts at step 302 by determining that the input pixel 418 does not represent the ground plane and does not modify G0 and G1.

At step 306 the pixel encoder 102 determines that the input pixel 418 represents the bridge plane and sets B0 and B1 to 10 per table 308 to indicate the road type.

At step 310 the pixel encoder 102 determines that the input pixel 418 does not represent the tunnel plane and does not modify T0 and T1.

At step 314 the pixel encoder 102 determines that the input pixel 418 represents a bridge shape endpoint and sets E0 and E1 to 01 per table 316 to indicate the up type. The result is the bit encoding 442. The pixel encoder 102 then returns to step 218 of the map generator 100.

Embodiment B of the pixel encoder 102 starts at step 320 by determining that the input pixel 418 does not represent the ground plane and does not modify G0, G1, G2, and G3.

At step 324 the pixel encoder 102 determines that the input pixel 418 represents the bridge plane and sets B0 to 1 per table 326 to indicate the bridge type.

At step 328 the pixel encoder 102 determines that the input pixel 418 does not represent the tunnel plane and does not modify T0.

At step 332 the pixel encoder 102 determines that the input pixel 418 represents a bridge shape endpoint and sets E0 and E1 to 01 per table 334 to indicate the up type. The result is the bit encoding 444. The pixel encoder 102 then returns to step 218 of the map generator 100.

At step 218 the map generator 100 determines that unprocessed pixels remain from raster 406 and selects pixel 420.

At step 220 the map generator 100 determines that pixel 420 represents the bridge plane. This determination is made by assessing the value of the "Bridge" attribute; in this case, the value is "True".

At step 222 the map generator 100 determines that pixel 420 does not represent the ground plane, and proceeds to step 224.

At step 224, the map generator 100 determines that, because the position of pixel 420 does not closely correspond to the position of one of the endpoints of the road shape 414, pixel 420 does not represent a shape endpoint.

At step 226 the map generator 100 uses the pixel encoder 102 to obtain a bit encoding for pixel 420, specifying the bridge plane and road type and denying that the pixel represents a shape endpoint.

Embodiment A of the pixel encoder 102 starts at step 302 by determining that the input pixel 420 does not represent the ground plane and does not modify G0 and G1.

At step 306 the pixel encoder 102 determines that the input pixel 420 represents the bridge plane and sets B0 and B1 to 10 per table 308 to indicate the road type.

At step 310 the pixel encoder 102 determines that the input pixel 420 does not represent the tunnel plane and does not modify T0 and T1.

At step 314 the pixel encoder 102 determines that the input pixel 420 does not represent a shape endpoint and does not modify E0 and E1. The result is the bit encoding 450. The pixel encoder 102 then returns to step 218 of the map generator 100.

Embodiment B of the pixel encoder 102 starts at step 320 by determining that the input pixel 420 does not represent the ground plane and does not modify G0, G1, G2, and G3.

At step 324 the pixel encoder 102 determines that the input pixel 420 represents the bridge plane and sets B0 to 1 per table 326 to indicate the bridge type.

At step 328 the pixel encoder 102 determines that the input pixel 420 does not represent the tunnel plane and does not modify T0.

At step 332 the pixel encoder 102 determines that the input pixel 420 does not represent a shape endpoint and does not modify E0 and E1. The result is the bit encoding 452. The pixel encoder 102 then returns to step 218 of the map generator 100.

At step 218 the map generator 100 determines that unprocessed pixels remain from raster 406 and selects pixel 422.

At step 220 the map generator 100 determines that pixel 422 represents the bridge plane. This determination is made by assessing the value of the "Bridge" attribute; in this case, the value is "True".

At step 222 the map generator 100 determines that pixel 422 does not represent the ground plane, and proceeds to step 224.

At step 224, the map generator 100 determines that, because the position of pixel 422 closely corresponds to the position of one of the endpoints of the road shape 414, pixel 422 represents a shape endpoint.

At step 226 the map generator 100 uses the pixel encoder 102 to obtain a bit encoding for pixel 422, specifying the bridge plane and road type and affirming that the pixel represents a shape endpoint, thus resulting in bit encoding 442 in embodiment A of the pixel encoder 102 and bit encoding 444 in embodiment B of the pixel encoder 102.

At step 218 the map generator 100 determines that all pixels from raster 406 are processed, and returns to step 214.

At step 214 the map generator 100 determines that all shapes of vector data type road are processed, and returns to step 212.

At step 212 the map generator 100 determines that unprocessed vector data types remain and selects the trail vector data type from table 210.

At step 214 the map generator 100 determines that unprocessed vector data shapes of type trail remain and selects the trail shape 416.

At step 216 the map generator 100 rasterizes the trail shape 416 to raster 410 having non-empty pixels 424, 426, and 428.

At step 218 the map generator 100 determines that unprocessed pixels remain from raster 410 and selects pixel 424.

At step 220 the map generator 100 determines that pixel 424 represents the tunnel plane. This determination is made by assessing the value of the "Tunnel" attribute; in this case, the value is "True".

At step 222 the map generator 100 determines that pixel 424 does not represent the ground plane, and proceeds to step 224.

At step 224, the map generator 100 determines that, because the position of pixel 424 closely corresponds to the position of one of the endpoints of the trail shape 416, pixel 424 represents a shape endpoint.

At step 226 the map generator 100 uses the pixel encoder 102 to obtain a bit encoding for pixel 424, specifying the tunnel plane and trail type and affirming that the pixel represents a shape endpoint.

Embodiment A of the pixel encoder 102 starts at step 302 by determining that the input pixel 424 does not represent the ground plane and does not modify G0 and G1.

At step 306 the pixel encoder 102 determines that the input pixel 424 does not represent the bridge plane does not modify B0 and B1.

At step 310 the pixel encoder 102 determines that the input pixel 424 represents the tunnel plane and sets to T0 and T1 to 01 per table 312 to indicate the trail type.

At step 314 the pixel encoder 102 determines that the input pixel 424 represents a tunnel shape endpoint and sets E0 and E1 to 10 per table 316 to indicate the down type. The result is the bit encoding 438. The pixel encoder 102 then returns to step 218 of the map generator 100.

Embodiment B of the pixel encoder 102 starts at step 320 by determining that the input pixel 424 does not represent the ground plane and does not modify G0, G1, G2, and G3.

At step 324 the pixel encoder 102 determines that the input pixel 424 does not represent the bridge plane and does not modify B0.

At step 328 the pixel encoder 102 determines that the input pixel 424 represents the tunnel plane and sets T0 to 1 per table 330 to reflect the tunnel type.

At step 332 the pixel encoder 102 determines that the input pixel 424 represents a tunnel shape endpoint and sets E0 and E1 to 10 per tab 334 to indicate the down type. The result is the bit encoding 440. The pixel encoder 102 then returns to step 218 of the map generator 100.

At step 218 the map generator 100 determines that unprocessed pixels remain from raster 410 and selects pixel 426.

At step 220 the map generator 100 determines that pixel 426 represents the tunnel plane. This determination is made by assessing the value of the "Tunnel" attribute; in this case, the value is "True".

At step 222 the map generator 100 determines that pixel 426 does not represent the ground plane, and proceeds to step 224.

At step 224, the map generator 100 determines that, because the position of pixel 426 does not closely correspond to the position of one of the endpoints of the trail shape 416, pixel 426 does not represent a shape endpoint.

At step 226 the map generator 100 uses the pixel encoder 102 to obtain a bit encoding for pixel 426, specifying the tunnel plane and trail type and denying that the pixel represents a shape endpoint.

Embodiment A of the pixel encoder 102 starts at step 302 by determining that the input pixel 426 does not represent the ground plane and does not modify G0 and G1.

At step 306 the pixel encoder 102 determines that the input pixel 426 does not represent the bridge plane does not modify B0 and B1.

At step 310 the pixel encoder 102 determines that the input pixel 426 represents the tunnel plane and sets to T0 and T1 to 01 per table 312 to indicate the trail type.

At step 314 the pixel encoder 102 determines that the input pixel 426 does not represent a tunnel shape endpoint and does not modify E0 and E1. The result is the bit encoding 446. The pixel encoder 102 then returns to step 218 of the map generator 100.

Embodiment B of the pixel encoder 102 starts at step 320 by determining that the input pixel 426 does not represent the ground plane and does not modify G0, G1, G2, and G3.

At step 324 the pixel encoder 102 determines that the input pixel 426 does not represent the bridge plane and does not modify B0.

At step 328 the pixel encoder 102 determines that the input pixel 426 represents the tunnel plane and sets T0 to 1 per table 330 to reflect the tunnel type.

At step 332 the pixel encoder 102 determines that the input pixel 426 does not represent a tunnel shape endpoint and does not modify E0 and E1. The result is the bit encoding 448. The pixel encoder 102 then returns to step 218 of the map generator 100.

At step 218 the map generator 100 determines that unprocessed pixels remain from raster 410, and selects pixel 428.

At step 220 the map generator 100 determines that pixel 428 represents the tunnel plane. This determination is made by assessing the value of the "Tunnel" attribute; in this case, the value is "True".

At step 222 the map generator 100 determines that pixel 428 does not represent the ground plane, and proceeds to step 224.

At step 224, the map generator 100 determines that, because the position of pixel 428 closely corresponds to the position of one of the endpoints of the trail shape 416, pixel 428 represents a shape endpoint.

At step 226 the map generator 100 uses the pixel encoder 102 to obtain a bit encoding for pixel 428, specifying the tunnel plane and trail type and affirming that the pixel represents a shape endpoint, thus resulting in the bit encoding 438 in embodiment A of the pixel encoder 102 and bit encoding 440 in embodiment B of the pixel encoder 102.

At step 218 the map generator 100 determines that all pixels from raster 410 are processed and returns to step 214.

At step 214 the map generator 100 determines that all shapes of vector data type trail are processed and returns to step 212.

At step 212 the map generator 100 determines that all vector data types are processed and exits.

Figure 5A:
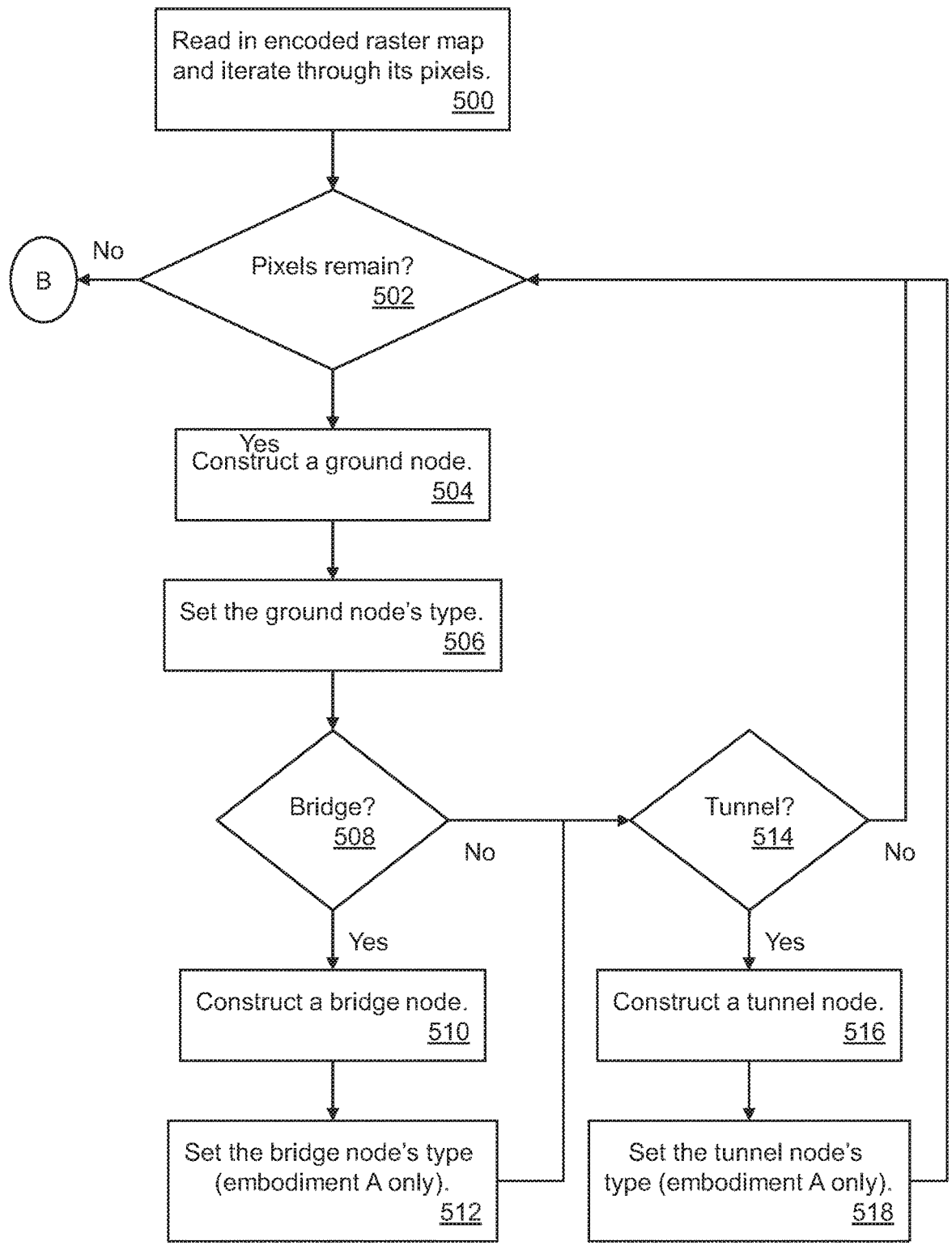
FIGS. 5A, 5B, and 5C illustrate Map Transformer Flowcharts.
Figure 5B:
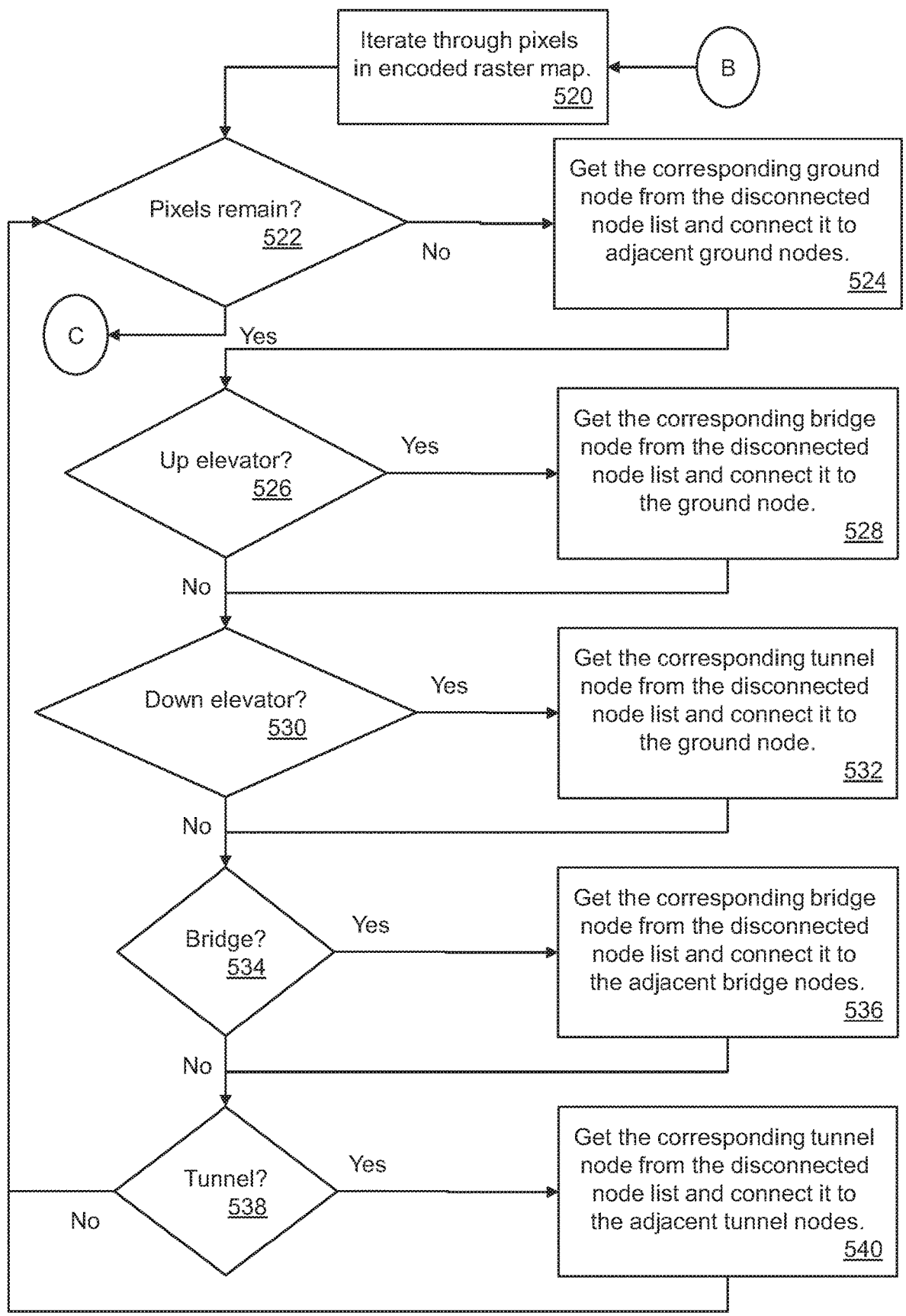
Figure 5C:
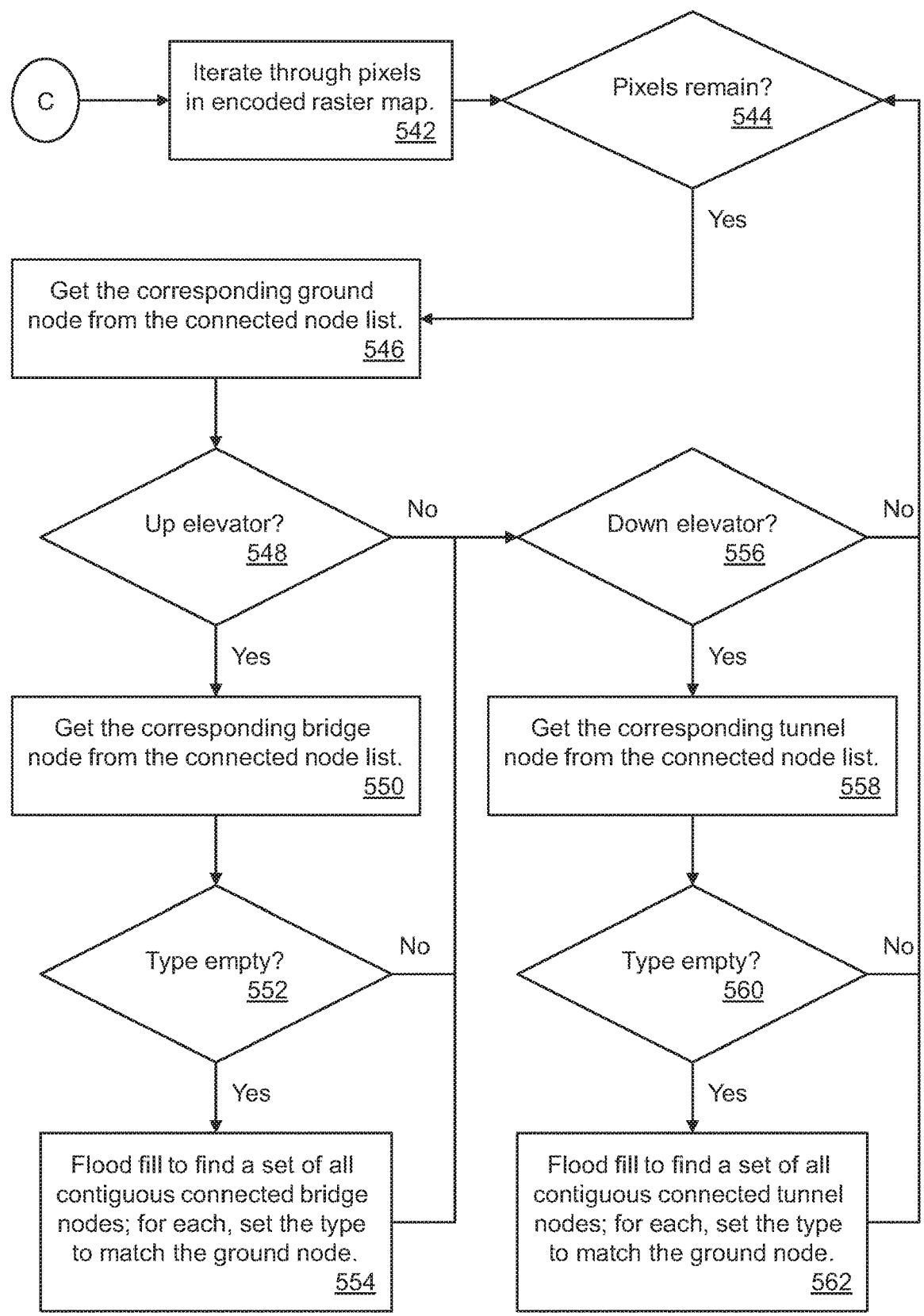

FIG. 5A, FIG. 5B, and FIG. 5C show exemplary embodiments of the map transformer 106.

FIG. 5A shows the map transformer 106 process for constructing nodes. The input is an encoded raster map. The output is a collection of disconnected nodes, each node corresponding to a pixel in the encoded raster map. In embodiment A, each node has a type. In embodiment B, ground nodes have a type, but bridge and tunnel nodes do not.

At step 500, the map transformer 106 reads in the encoded raster map and begins iterating through its pixels.

At step 502, the map transformer 106 determines whether there are remaining pixels in the encoded raster map. If so, the map transformer 106 proceeds to step 504. Otherwise, the map transformer 106 proceeds to step 520.

At step 504, the map transformer 106 constructs a ground node representing the current pixel and adds the ground node to a disconnected node list.

At step 506, the map transformer 106 sets the ground node's type to the type found by decoding the current pixel.

At step 508, the map transformer 106 determines if the current pixel specifies a bridge by decoding the current pixel. If so, the map transformer 106 proceeds to step 510. Otherwise, the map transformer 106 proceeds to step 514.

At step 510, the map transformer 106 constructs a bridge node representing the current pixel and adds the bridge node to the disconnected node list.

At step 512, in embodiment A, the map transformer 106 sets the bridge node's type to the type found by decoding the current pixel.

At step 514, the map transformer 106 determines if the current pixel specifies a tunnel by decoding the current pixel. If so, the map transformer 106 proceeds to step 516. Otherwise, the map transformer 106 returns to step 502.

At step 516, the map transformer 106 constructs a tunnel node representing the current pixel and adds the tunnel node to the disconnected node list.

At step 518, in embodiment A, the map transformer 106 sets the tunnel node's type to the type found by decoding the current pixel.

The map transformer 106 then returns to step 502. Eventually, the map transformer 106 finishes iterating through the pixels of the encoded raster map, exits step 502, and proceeds to step 520.

FIG. 5B shows the map transformer 106 process for constructing edges. The input is an encoded raster map with collection of corresponding nodes. The output is a collection of properly connected nodes.

At step 520, the map transformer 106 begins iterating through the pixels of the encoded raster map.

At step 522, the map transformer 106 determines if there are pixels remaining in the encoded raster map. If so, the map transformer 106 proceeds to step 524. Otherwise, the map transformer 106 proceeds to step 542.

At step 524, the map transformer 106 gets the current ground node representing the current pixel from the disconnected node list, identifies the 8-connected set of adjacent pixels, and for each, gets the corresponding adjacent ground node from the disconnected node list and updates a connected node list to connect the current ground node to the adjacent ground node. To store the connected node list, the map transformer 106 utilizes an adjacency list as described by pages 527 to 529 of "Introduction to Algorithms, Second Edition" by Thomas Carmen, Charles Leiserson, Ronald Rivest, and Clifford Stein. Those skilled in the art will realize that a pixel connectivity scheme other than 8-connected could be substituted, such as 4-connected. Those skilled in the art will also realize that a graph representation scheme other than an adjacency list could be substituted, such as an adjacency matrix.

At step 526, the map transformer 106 determines if the current pixel specifies an up elevator by decoding the current pixel. If so, the map transformer 106 proceeds to step 528. Otherwise, the map transformer 106 proceeds to step 530.

At step 528, the map transformer 106 gets the bridge node representing the current pixel from the disconnected node list and updates the connected node list to connect the bridge node to the current ground node.

At step 530, the map transformer 106 determines if the current pixel specifies a down elevator by decoding the current pixel. If so, the map transformer 106 proceeds to step 532. Otherwise, the map transformer 106 proceeds to step 534.

At step 532, the map transformer 106 gets the tunnel node representing the current pixel from the disconnected node list and updates the connected node list to connect the tunnel node to the current ground node.

At step 534, the map transformer 106 determines if the current pixel specifies a bridge by decoding the current pixel. If so, the map transformer 106 proceeds to step 536. Otherwise, the map transformer 106 proceeds to step 538.

At step 536, the map transformer 106 gets the current bridge node representing the current pixel from the disconnected node list, identifies the 8-connected set of adjacent pixels that also specify a bridge, and for each, gets the corresponding adjacent bridge node from the disconnected node list and updates a connected node list to connect the current bridge node to the adjacent bridge node.

At step 538, the map transformer 106 determines if the current pixel specifies a tunnel by decoding the current pixel. If so, the map transformer 106 proceeds to step 540. Otherwise, the map transformer 106 returns to step 532.

At step 540, the map transformer 106 gets the current tunnel node representing the current pixel from the disconnected node list, identifies the 8-connected set of adjacent pixels that also specify a tunnel, and for each, gets the corresponding adjacent tunnel node from the disconnected node list and updates a connected node list to connect the current tunnel node to the adjacent tunnel node.

The map transformer 106 then returns to step 522. Eventually, the map transformer 106 finishes iterating through the pixels of the encoded raster map, exits step 522, and in embodiment B only, proceeds to step 542.

FIG. 5C shows the map transformer 106 flood fill process (embodiment B only). The input is an encoded raster map with a collection of corresponding connected nodes. In the input, ground nodes have types, but bridge and tunnel nodes do not. In the output, all nodes have types.

At step 542 the map transformer 106 begins iterating through the pixels of the encoded raster map.

At step 544 the map transformer 106 determines if there are pixels remaining in the encoded raster map. If so, the map transformer 106 proceeds to step 546.

At step 546 the map transformer 106 gets the current ground node representing the current pixel.

At step 548 the map transformer 106 determines if the current pixel specifies an up elevator by decoding the current pixel. If so, the map transformer 106 proceeds to step 550. Otherwise, the map transformer 106 proceeds to step 556.

At step 550 the map transformer 106 gets the bridge node representing the current pixel from the connected node list.

At step 552 the map transformer 106 determines if the type field of the bridge node is empty. If so, the map transformer 106 proceeds to step 554. Otherwise, the map transformer 106 proceeds to step 556.

At step 554 the map transformer 106 finds a set of bridge nodes which are contiguously connected to the bridge node, and for each, sets the type field to equal the type field of the current ground node.

At step 556, the map transformer 106 determines if the current pixel specifies a down elevator by decoding the current pixel. If so, the map transformer proceeds to step 558. Otherwise, the map transformer 106 returns to step 544.

At step 558, the map transformer 106 gets the tunnel node representing the current pixel from the connected node list.

At step 560 the map transformer 106 determines if the type field of the tunnel node is empty. If so, the map transformer 106 proceeds to step 544. Otherwise, the map transformer 106 proceeds to step 562.

At step 562 the map transformer 106 finds a set of tunnel nodes which are contiguously connected to the tunnel node, and for each, sets the type field to equal the type field of the current ground node.

The map transformer 106 then returns to step 544.

Figure 6E:
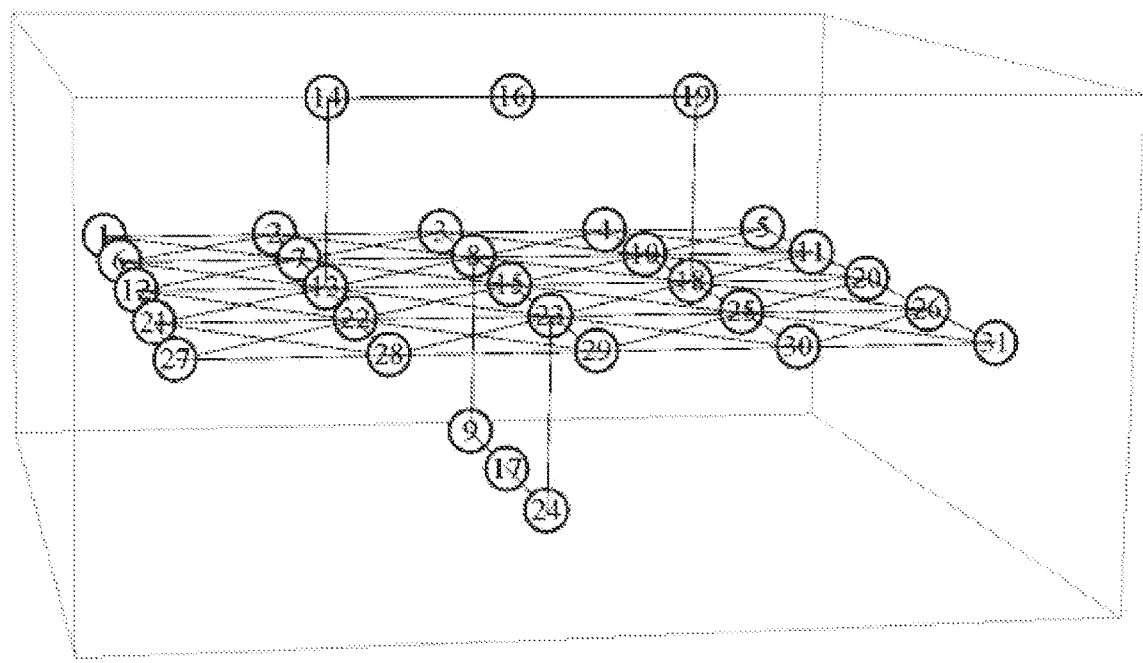

FIG. 6 provides an example of using the map transformer 106.

The map transformer 106 starts by constructing nodes as shown in FIG. 5A.

In embodiment A, at step 500 the map transformer 106 reads in the encoded raster 600 from left to right and top to bottom to produce a list of pixels 602.

In embodiment B, at step 500 the map transformer 106 reads in the encoded raster 600 from left to right and top to bottom to produce a list of pixels 604.

At step 502 the map transformer 106 determines that unprocessed pixels remain in the list of pixels 602 (embodiment A) or 604 (embodiment B), and selects pixel 1.

At step 504 the map transformer 106 constructs node 1 in the disconnected node list 606 (embodiment A) or 608 (embodiment B) and sets its plane to ground.

At step 506 both embodiment A and embodiment B of the map transformer 106 set the type of node 1 to grass. In embodiment A, the type is determined by using bits G0 and G1 of bit encoding 300 as a lookup key for table 304. In this case, G0 and G1 are 00, which indicates grass. In embodiment B, the type is determined by using bits G0, G1, G2, and G3 of bit encoding 318 as a lookup key for table 322. In this case, G0, G1, G2, and G3 are 0000, which indicates grass.

At step 508, the map transformer 106 determines that pixel 1 does not specify a bridge. In embodiment A, this determination is made by using bits B0 and B1 of bit encoding 300 as a lookup key for table 308. In this case, B0 and B1 are 00, which indicates none (no bridge). In embodiment B, the type is determined by using bit B0 of bit encoding 318 as a lookup key for table 326. In this case, B0 is 0, which indicates none (no bridge).

At step 514, the map transformer 106 determines that pixel 1 does not specify a tunnel. In embodiment A, this determination is made by using bits T0 and T1 of bit encoding 300 as a lookup key for table 312. In this case, T0 and T1 are 00, which indicates none (no tunnel). In embodiment B, the type is determined by using bit T0 of bit encoding 318 as a lookup key for table 330. In this case, T0 is 0, which indicates none (no tunnel).

At step 502, the map transformer 106 eventually selects pixel 8 from the list of pixels 602 (embodiment A) or 604 (embodiment B).

At step 504 the map transformer 106 constructs node 8 in the disconnected node list 606 (embodiment A) or 608 (embodiment B) and sets its plane to ground.

At step 506 the map transformer 106 sets the type of node 8 to grass. In embodiment A, the type is determined by using bits G0 and G1 of bit encoding 300 as a lookup key for table 304. In this case, G0 and G1 are 00, which indicates grass. In embodiment B, the type is determined by using bits G0, G1, G2, and G3 of bit encoding 318 as a lookup key for table 322. In this case, G0, G1, G2, and G3 are 0000, which indicates grass.

At step 508 the map transformer 106 determines that pixel 8 does not specify a bridge. In embodiment A, this determination is made by using bits B0 and B1 of bit encoding 300 as a lookup key for table 308. In this case, B0 and B1 are 00, which indicates none (no bridge). In embodiment B, the type is determined by using bit B0 of bit encoding 318 as a lookup key for table 326. In this case, B0 is 0, which indicates none (no bridge).

At step 514, the map transformer 106 determines that pixel 1 specifies a tunnel. In embodiment A, this determination is made by using bits T0 and T1 of bit encoding 300 as a lookup key for table 312. In this case, T0 and T1 are 01, which indicates a tunnel. In embodiment B, the type is determined by using bit T0 of bit encoding 318 as a lookup key for table 330. In this case, T0 is 1, which indicates a tunnel.

At step 516 the map transformer 106 constructs node 9 in the disconnected node list 606 (embodiment A) or 608 (embodiment B) and sets its plane to tunnel.

In embodiment A only, at step 518 the map transformer 106 sets the type of node 9 to trail. The type is determined by using bits T0 and T1 of bit encoding 300 as a lookup key for table 312. In this case, T0 and T1 are 01, which indicates trail.

At step 502, the map transformer 106 eventually selects pixel 12 from the list of pixels 602 (embodiment A) or 604 (embodiment B).

At step 504 the map transformer 106 constructs node 13 in the disconnected node list 606 (embodiment A) or 608 (embodiment B) and sets its plane to ground.

At step 506 the map transformer 106 sets the type of node 13 to grass. In embodiment A, the type is determined by using bits G0 and G1 of bit encoding 300 as a lookup key for table 304. In this case, G0 and G1 are 00, which indicates grass. In embodiment B, the type is determined by using bits G0, G1, G2, and G3 of bit encoding 318 as a lookup key for table 322. In this case, G0, G1, G2, and G3 are 0000, which indicates grass.

At step 508 the map transformer 106 determines that pixel 12 specifies a bridge. In embodiment A, this determination is made by using bits B0 and B1 of bit encoding 300 as a lookup key for table 308. In this case, B0 and B1 are 10, which indicates a bridge. In embodiment B, the type is determined by using bit B0 of bit encoding 318 as a lookup key for table 326. In this case, B0 is 1, which indicates a bridge.

At step 510 the map transformer 106 constructs node 14 in the disconnected node list 606 (embodiment A) or 608 (embodiment B) and sets its plane to bridge.

In embodiment A only, at step 512 the map transformer 106 sets the type of node 14 to road. The type is determined by using bits B0 and B1 of bit encoding 300 as a lookup key for table 308. In this case, B0 and B1 are 10, which indicates road.

At step 514 the map transformer 106 determines that pixel 12 does not specify a tunnel. In embodiment A, this determination is made by using bits T0 and T1 of bit encoding 300 as a lookup key for table 312. In this case, T0 and T1 are 00, which indicates none (no tunnel). In embodiment B, the type is determined by using bit T0 of bit encoding 318 as a lookup key for table 330. In this case, T0 is 0, which indicates none (no tunnel).

At step 502 the map transformer 106 selects pixel 13 from the list of pixels 602 (embodiment A) or 604 (embodiment B).

At step 504 the map transformer 106 constructs node 15 in the disconnected node list 606 (embodiment A) or 608 (embodiment B) and sets its plane to ground.

At step 506 the map transformer 106 sets the type of node 15 to grass. In embodiment A, the type is determined by using bits G0 and G1 of bit encoding 300 as a lookup key for table 304. In this case, G0 and G1 are 00, which indicates grass. In embodiment B, the type is determined by using bits G0, G1, G2, and G3 of bit encoding 318 as a lookup key for table 322. In this case, G0, G1, G2, and G3 are 0000, which indicates grass.

At step 508 the map transformer 106 determines that pixel 13 specifies a bridge. In embodiment A, this determination is made by using bits B0 and B1 of bit encoding 300 as a lookup key for table 308. In this case, B0 and B1 are 10, which indicates a bridge. In embodiment B, the type is determined by using bit B0 of bit encoding 318 as a lookup key for table 326. In this case, B0 is 1, which indicates a bridge.

At step 510 the map transformer 106 constructs node 16 in the disconnected node list 606 (embodiment A) or 608 (embodiment B) and sets its plane to bridge.

In embodiment A only, at step 512 the map transformer 106 sets the type of node 16 to road. The type is determined by using bits B0 and B1 of bit encoding 300 as a lookup key for table 308. In this case, B0 and B1 are 10, which indicates road.

At step 514 the map transformer 106 determines that pixel 13 specifies a tunnel. In embodiment A, this determination is made by using bits T0 and T1 of bit encoding 300 as a lookup key for table 312. In this case, T0 and T1 are 01, which indicates a tunnel. In embodiment B, the type is determined by using bit T0 of bit encoding 318 as a lookup key for table 330. In this case, T0 is 1, which indicates a tunnel.

At step 516 the map transformer 106 constructs node 17 in the disconnected node list 606 (embodiment A) or 608 (embodiment B) and sets its plane to tunnel.

In embodiment A only, at step 518 the map transformer 106 sets the type of node 17 to trail. The type is determined by using bits T0 and T1 of bit encoding 300 as a lookup key for table 312. In this case, T0 and T1 are 01, which indicates trail.

Eventually, at step 502 the map transformer 106 determines that all pixels in the encoded raster 600 have been processed. At this point, embodiment A of the map transformer 106 will have produced the disconnected node list 606, and embodiment B of the map transformer 106 will have produced the disconnected node list 608.

Next, the map transformer 106 proceeds to step 520. At step 520 the map transformer 106 begins iterating through the list of pixels 602 (embodiment A) or 604 (embodiment B).

At step 522 the map transformer 106 determines that unprocessed pixels remain in the list of pixels 602 (embodiment A) or 604 (embodiment B) and selects pixel 1.

At step 524 the map transformer 106 determines that node 1 corresponds to pixel 1 and connects node 1 to its 8-connected adjacent nodes 2, 6, and 7 in the connected node list 610.

At step 526 the map transformer 106 determines that pixel 1 does not specify an up elevator. In embodiment A, this determination is made by using bits E0 and E1 of bit encoding 300 as a lookup key for table 316. In this case, E0 and E1 are 00, which indicates none (no elevator). In embodiment B, this determination is made by using bits E0 and E1 of bit encoding 318 as a lookup key for table 334. In this case, E0 and E1 are 00, which indicates none (no elevator).

At step 530 the map transformer 106 determines that pixel 1 does not specify a down elevator. In embodiment A, this determination is made by using bits E0 and E1 of bit encoding 300 as a lookup key for table 316. In this case, E0 and E1 are 00, which indicates none (no elevator). In embodiment B, this determination is made by using bits E0 and E1 of bit encoding 318 as a lookup key for table 334. In this case, E0 and E1 are 00, which indicates none (no elevator).

At step 534 the map transformer 106 determines that pixel 1 does not specify a bridge. In embodiment A, this determination is made by using bits B0 and B1 of bit encoding 300 as a lookup key for table 308. In this case, B0 and B1 are 00, which indicates none (no bridge). In embodiment B, this determination is made by using bit B0 of bit encoding 318 as a lookup key for table 326. In this case, B0 is 0, which indicates none (no bridge).

At step 538 the map transformer 106 determines that pixel 1 does not specify a tunnel. In embodiment A, this determination is made by using bits T0 and T1 of bit encoding 300 as a lookup key for table 312. In this case, T0 and T1 are 00, which indicates none (no tunnel). In embodiment B, this determination is made by using bit T0 of bit encoding 318 as a lookup key for table 330. In this case, T0 is 0, which indicates none (no tunnel).

At step 522 the map transformer 106 eventually selects pixel 8 from the list of pixels 602 (embodiment A) or 604 (embodiment B).

At step 524 the map transformer 106 determines that node 8 corresponds to pixel 8 and connects node 8 to its 8-connected adjacent nodes 2, 3, 4, 7, 10, 13, 15, and 18 in the connected node list 610.

At step 526 the map transformer 106 determines that pixel 8 does not specify an up elevator. In embodiment A, this determination is made by using bits E0 and E1 of bit encoding 300 as a lookup key for table 316. In this case, E0 and E1 are 10, which indicates none (no elevator). In embodiment B, this determination is made by using bits E0 and E1 of bit encoding 318 as a lookup key for table 334. In this case, E0 and E1 are 00, which indicates none (no elevator).

At step 530 the map transformer 106 determines that pixel 8 specifies a down elevator. In embodiment A, this determination is made by using bits E0 and E1 of bit encoding 300 as a lookup key for table 316. In this case, E0 and E1 are 10, which indicates a down elevator. In embodiment B, this determination is made by using bits E0 and E1 of bit encoding 318 as a lookup key for table 334. In this case, E0 and E1 are 10, which indicates a down elevator.

At step 532 the map transformer 106 determines that node 9 corresponds to pixel 8 and connects node 9 to node 8 in the connected node list 610.

At step 534 the map transformer 106 determines that pixel 8 does not specify a bridge. In embodiment A, this determination is made by using bits B0 and B1 of bit encoding 300 as a lookup key for table 308. In this case, B0 and B1 are 00, which indicates none (no bridge). In embodiment B, this determination is made by using bit B0 of bit encoding 318 as a lookup key for table 326. In this case, B0 is 0, which indicates none (no bridge).

At step 538 the map transformer 106 determines that pixel 8 specifies a tunnel. In embodiment A, this determination is made by using bits T0 and T1 of bit encoding 300 as a lookup key for table 312. In this case, T0 and T1 are 01, which indicates a tunnel. In embodiment B, this determination is made by using bit T0 of bit encoding 318 as a lookup key for table 330. In this case, T0 is 1, which indicates a tunnel.

At step 540 the map transformer 106 determines that node 9 corresponds to pixel 8 and connects node 9 to its 8-connected adjacent node 17 in the connected node list 610.

At step 522 the map transformer 106 eventually selects pixel 12 from the list of pixels 602 (embodiment A) or 604 (embodiment B).

At step 524 the map transformer 106 determines that node 13 corresponds to pixel 12 and connects node 13 to its 8-connected adjacent nodes 6, 7, 8, 12, 15, 21, 22, and 23 in the connected node list 610.

At step 526 the map transformer 106 determines that pixel 12 specifies an up elevator. In embodiment A, this determination is made by using bits E0 and E1 of bit encoding 300 as a lookup key for table 316. In this case, E0 and E1 are 01, which indicates an up elevator. In embodiment B, this determination is made by using bits E0 and E1 of bit encoding 318 as a lookup key for table 334. In this case, E0 and E1 are 01, which indicates an up elevator.

At step 528 the map transformer 106 determines that node 14 corresponds to pixel 12 and connects node 14 to node 13 in the connected node list 610.

At step 530 the map transformer 106 determines that pixel 12 does not specify a down elevator. In embodiment A, this determination is made by using bits E0 and E1 of bit encoding 300 as a lookup key for table 316. In this case, E0 and E1 are 00, which indicates none (no elevator). In embodiment B, this determination is made by using bits E0 and E1 of bit encoding 318 as a lookup key for table 334. In this case, E0 and E1 are 00, which indicates none (no elevator).

At step 534 the map transformer 106 determines that pixel 12 specifies a bridge. In embodiment A, this determination is made by using bits B0 and B1 of bit encoding 300 as a lookup key for table 308. In this case, B0 and B1 are 10, which indicates a bridge. In embodiment B, this determination is made by using bit B0 of bit encoding 318 as a lookup key for table 326. In this case, B0 is 1, which indicates a bridge.

At step 536 the map transformer 106 determines that node 14 corresponds to pixel 12 and connects node 14 to its 8-connected adjacent node 16 in the connected node list 610.

At step 538 the map transformer 106 determines that pixel 12 does not specify a tunnel. In embodiment A, this determination is made by using bits T0 and T1 of bit encoding 300 as a lookup key for table 312. In this case, T0 and T1 are 00, which indicates none (no tunnel). In embodiment B, this determination is made by using bit T0 of bit encoding 318 as a lookup key for table 330. In this case, T0 is 0, which indicates none (no tunnel).

At step 522 the map transformer 106 selects pixel 13 from the list of pixels 602 (embodiment A) or 604 (embodiment B).

At step 524 the map transformer 106 determines that node 15 corresponds to pixel 13 and connects node 15 to its 8-connected adjacent nodes 7, 8, 10, 13, 18, 22, 23, and 25 in the connected node list 610.

At step 526 the map transformer 106 determines that pixel 13 does not specify an up elevator. In embodiment A, this determination is made by using bits E0 and E1 of bit encoding 300 as a lookup key for table 316. In this case, E0 and E1 are 00, which indicates none (no elevator). In embodiment B, the type is determined by using bits E0 and E1 of bit encoding 318 as a lookup key for table 334. In this case, E0 and E1 are 00, which indicates none (no elevator).

At step 530 the map transformer 106 determines that pixel 13 does not specify a down elevator. In embodiment A, this determination is made by using bits E0 and E1 of bit encoding 300 as a lookup key for table 316. In this case, E0 and E1 are 00, which indicates none (no elevator). In embodiment B, the type is determined by using bits E0 and E1 of bit encoding 318 as a lookup key for table 334. In this case, E0 and E1 are 00, which indicates none (no elevator).

At step 534 the map transformer 106 determines that pixel 13 specifies a bridge. In embodiment A, this determination is made by using bits B0 and B1 of bit encoding 300 as a lookup key for table 308. In this case, B0 and B1 are 10, which indicates a bridge. In embodiment B, this determination is made by using bit B0 of bit encoding 318 as a lookup key for table 326. In this case, B0 is 1, which indicates a bridge.

At step 536 the map transformer 106 determines that node 16 corresponds to pixel 13 and connects node 16 to its 8-connected adjacent nodes 14 and 19 in the connected node list 610.

At step 538 the map transformer 106 determines that pixel 13 specifies a tunnel. In embodiment A, this determination is made by using bits T0 and T1 of bit encoding 300 as a lookup key for table 312. In this case, T0 and T1 are 01, which indicates a tunnel. In embodiment B, this determination is made by using bit T0 of bit encoding 318 as a lookup key for table 330. In this case, T0 is 1, which indicates a tunnel.

At step 540 the map transformer 106 determines that node 17 corresponds to pixel 13 and connects node 17 to its 8-connected adjacent nodes 9 and 24 in the connected node list 610.

Eventually, at step 522 the map transformer 106 determines that all pixels have been processed. At this point, the map transformer 106 will have produced a graph as specified by the connected node list 610 and as visualized by the 3D graph 612.

Next, in embodiment B only, the map transformer 106 uses a flood fill technique to propagate ground node types via elevators to bridge and tunnel nodes as shown in FIG. 5C.

At step 542 the map transformer 106 begins iterating through the list of pixels 604.

At step 544 the map transformer 106 determines that unprocessed pixels remain in the list of pixels 604 and selects pixel 1.

At step 546 the map transformer 106 determines that node 1 corresponds to pixel 1.

At step 548 the map transformer 106 determines that pixel 1 does not specify an up elevator.

At step 556 the map transformer 106 determines that pixel 1 does not specify a down elevator.

At step 544 the map transformer 106 eventually selects pixel 8 from the list of pixels 604.

At step 546 the map transformer 106 determines that node 8 corresponds to pixel 8.

At step 548 the map transformer 106 determines that pixel 8 does not specify an up elevator.

At step 556 the map transformer 106 determines that pixel 8 specifies a down elevator.

At step 558 the map transformer 106 determines that node 9 corresponds to pixel 8.

At step 560 the map transformer 106 determines that the type of node 9 is empty.

At step 562 the map transformer 106 finds that the set of contiguous connected tunnel nodes is 9, 17, and 24. The map transformer 106 then determines that the type of node 8 is trail, and sets the types of nodes 9, 17, and 24 to trail.

At step 544 the map transformer 106 eventually selects pixel 12 from the list of pixels 604.

At step 546 the map transformer 106 determines that node 13 corresponds to pixel 12.

At step 548 the map transformer 106 determines that pixel 12 specifies an up elevator.

At step 550 the map transformer 106 determines that node 14 corresponds to pixel 12.

At step 552 the map transformer 106 determines that the type of node 14 is empty.

At step 554 the map transformer 106 finds that the set of contiguous connected bridge nodes is 14, 16, and 19. The map transformer 106 then determines that the type of node 13 is road, and sets the types of nodes 14, 16, and 19 to road.

At step 556 the map transformer 106 determines that pixel 8 does not specify a down elevator.

At step 544 the map transformer 106 eventually selects pixel 14 from the list of pixels 604.

At step 546 the map transformer 106 determines that node 18 corresponds to pixel 14.

At step 548 the map transformer 106 determines that pixel 14 specifies an up elevator.

At step 550 the map transformer 106 determines that node 19 corresponds to pixel 14.

At step 552 the map transformer 106 determines that the type of node 14 is not empty.

At step 556 the map transformer 106 determines that pixel 14 does not specify a down elevator.

At step 544 the map transformer 106 eventually selects pixel 18 from the list of pixels 604.

At step 546 the map transformer 106 determines that node 23 corresponds to pixel 18.

At step 548 the map transformer 106 determines that pixel 18 does not specify an up elevator.

At step 556 the map transformer 106 determines that pixel 18 specifies a down elevator.

At step 558 the map transformer 106 determines that node 24 corresponds to pixel 18.

At step 560 the map transformer 106 determines that the type of node 24 is not empty.

Eventually, at step 544 the map transformer 106 determines that all pixels have been processed. At this point, the map transformer 106 will have produced a graph as specified by the connected node list 610 and as visualized by the 30 graph 612.

Figure 7:
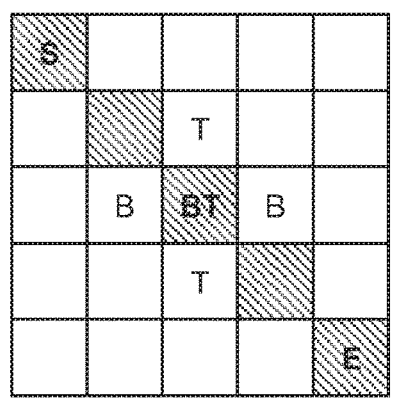
FIG. 7. illustrates a Route Generator Example.
Figure 7:
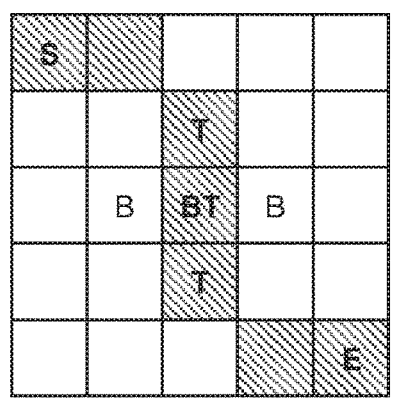
Figure 7:
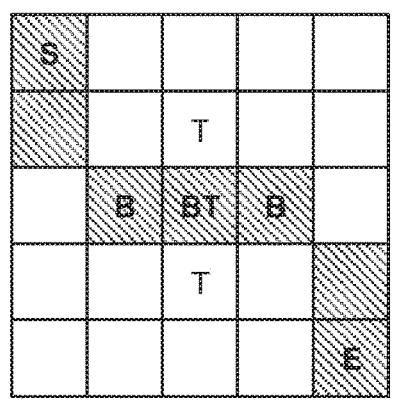

FIG. 7 provides an example of using the route generator 108. As explained above, the route generator 108 uses the connected node list produced by the map transformer 106 plus a well-known path finding algorithm such as A* to plan an optimal route. The optimal route depends on the speeds associated with the terrain types (e.g. grass, road, and trail). For example, diagrams 702, 704, and 706 depict possible optimal routes from the upper left start point to the lower right end point. Diagram 700 provides a key. The route depicted in diagram 702 results when the cost of traversing grass (ground) is low relative to those of traversing road (bridge) or trail (tunnel). The route depicted in diagram 704 results when the cost of traversing trail (tunnel) is low relative to those of traversing grass (ground) or road (bridge). The route depicted in diagram 706 results when the cost of traversing road (bridge) is low relative to those of traversing grass (ground) or trail (tunnel).

Those skilled in the art realize that multi-plane route planning systems are most easily built using vector-based approaches. However, both the creation of a raster-based multi-plane route planning system, as well as its advantages over the vector-based equivalent, are unobvious to those skilled in the art. The detailed description of the present invention describes how a person skilled in the art might create a raster-based multi-plane route planning system. To illustrate the advantages of the present invention over an equivalent conventional vector-based route planning system, consider the following scenario which compares how both approaches would store a graph data structure representing a dense environment exemplified by mixed off-road and urban terrain. In this scenario, a commander is planning routes for a military campaign to seize a 5,625 square kilometer city. The city is square, being both 75 kilometers wide and tall.

To facilitate route planning, the city must be represented by a dense weighted graph. At a resolution of 5 meters per node, the graph would have 75,000 meters|5 meters per node=15,000 nodes on each side for a total of 225,000,000 nodes. Route planning employs both approaches be able to uniquely identify any one of the graph's 225,000,000 nodes.

In the vector-based approach, each node ID comprises a 32-bit integer which allows explicit, unique identification of each node (a 32-bit integer can assume 4,294,967,295 possible values). In the raster-based approach, each node ID comprises zero bits. Why the difference? The raster-based approach employs implicit node identification where the center of each raster grid cell represents a node that is uniquely identified by the grid cell's index in the raster's rows and columns. Thus, zero bits are employed to uniquely identify nodes in the raster-based approach.

In the vector-based approach, an adjacency list is employed such that each node's edges need only comprise the ID of each connected node. In a conventional eight-connected graph, with M×N nodes, the number of edges is given by the following formula: 4 nm−3(n+m)+2. In the raster-based approach, edges are implicit among adjacent pairs of raster grid cells and thus zero bits are employed to store each edge.

In both the vector and raster-based approaches, a 16-bit integer is used to store the node weight. In the case of the raster-based approach, some of those bits will actually be allocated to storing topological information about multiple planes and their inter-connections.

The total storage employed by the vector-based approach is 8,549,280,016 bytes (approximately 8.5 GB), as indicated by the following formula: $T_{vector}=B_{td}(nm)+B_{cont}(nm)+B_{td}(4\ nm-3(\sqrt{nm}+\sqrt{mn})+2)$ The total storage employed by the raster-based approach is 450,000,000 bytes (450 MB), as indicated by the following formula: $T_{raster}=B_{cost}(nm)$ In this example, the raster-based approach consumes 94.74% less storage than the equivalent vector-based approach, as indicated by the following formula:

$$Diff_{percent} = 100 * \frac{T_{vector} - T_{raster}}{T_{vector}}$$

The above-described devices and subsystems of the exemplary embodiments of FIGS. 1 to 7 can include, for example, any suitable servers, workstations, PCs, laptop computers, PDAs, Internet appliances, handheld devices, cellular telephones, wireless devices, other electronic devices, and the like, capable of performing the processes of the exemplary embodiments of FIGS. 1 to 7. The devices and subsystems of the exemplary embodiments of FIGS. 1 to 7 can communicate with each other using any suitable protocol and can be implemented using one or more programmed computer systems or devices.

One or more interface mechanisms can be used with the exemplary embodiments of FIGS. 1 to 7, including, for example, Internet access, telecommunications in any suitable form (e.g., voice, modem, and the like), wireless communications media, and the like. For example, employed communications networks or links can include one or more wireless communications networks, cellular communications networks, cable communications networks, satellite communications networks, 3G communications networks, Public Switched Telephone Network (PSTNs), Packet Data Networks (PDNs), the Internet, intranets, WiMax Networks, a combination thereof, and the like.

It is to be understood that the devices and subsystems of the exemplary embodiments of FIGS. 1 to 7 are for exemplary purposes, as many variations of the specific hardware and/or software used to implement the exemplary embodiments are possible, as will be appreciated by those skilled in the relevant art(s). For example, the functionality of one or more of the devices and subsystems of the exemplary embodiments of FIGS. 1 to 7 can be implemented via one or more programmed computer systems or devices.

To implement such variations as well as other variations, a single computer system can be programmed to perform the special purpose functions of one or more of the devices and subsystems of the exemplary embodiments of FIGS. 1 to 7. On the other hand, two or more programmed computer systems or devices can be substituted for any one of the devices and subsystems of the exemplary embodiments of FIGS. 1 to 7. Accordingly, principles and advantages of distributed processing, such as redundancy, replication, and the like, also can be implemented, as desired, to increase the robustness and performance the devices and subsystems of the exemplary embodiments of FIGS. 1 to 7.

The devices and subsystems of the exemplary embodiments of FIGS. 1 to 7 can store information relating to various processes described herein. This information can be stored in one or more memories, such as a hard disk, optical disk, magneto-optical disk, RAM, and the like, of the devices and subsystems of the exemplary embodiments of FIGS. 1 to 7. One or more databases of the devices and subsystems of the exemplary embodiments of FIGS. 1 to 7 can store the information used to implement the exemplary embodiments of the present invention. The databases can be organized using data structures (e.g., records, tables, arrays, fields, graphs, trees, lists, and the like) included in one or more memories or storage devices listed herein.

The processes described with respect to the exemplary embodiments of FIGS. 1 to 7 can include appropriate data structures for storing data collected and/or generated by the processes of the devices and subsystems of the exemplary embodiments of FIGS. 1 to 7 in one or more databases thereof.

All or a portion of the devices and subsystems of the exemplary embodiments of FIGS. 1 to 7 can be conveniently implemented using one or more general purpose computer systems, microprocessors, digital signal processors, microcontrollers, and the like, programmed according to the teachings of the exemplary embodiments of the present invention, as will be appreciated by those skilled in the computer and software arts. Appropriate software can be readily prepared by programmers of ordinary skill based on the teachings of the exemplary embodiments, as will be appreciated by those skilled in the software art. In addition, the devices and subsystems of the exemplary embodiments of FIGS. 1 to 7 can be implemented by the preparation of application-specific integrated circuits or by interconnecting an appropriate network of conventional component circuits, as will be appreciated by those skilled in the electrical art(s). Thus, the exemplary embodiments are not limited to any specific combination of hardware circuitry and/or software.

Stored on any one or on a combination of computer readable media, the exemplary embodiments of the present invention can include software for controlling the devices and subsystems of the exemplary embodiments of FIGS. 1 to 7, for driving the devices and subsystems of the exemplary embodiments of FIGS. 1 to 7, for enabling the devices and subsystems of the exemplary embodiments of FIGS. 1 to 7 to interact with a human user, and the like. Such software can include, but is not limited to, device drivers, firmware, operating systems, development tools, applications software, and the like. Such computer readable media further can include the computer program product of an embodiment of the present invention for performing all or a portion (if processing is distributed) of the processing performed in implementing the exemplary embodiments of FIGS. 1 to 7. Computer code devices of the exemplary embodiments of the present invention can include any suitable interpretable or executable code mechanism, including but not limited to scripts, interpretable programs, dynamic link libraries (DLLs), Java classes and applets, complete executable programs, Common Object Request Broker Architecture (CORSA) objects, and the like. Moreover, parts of the processing of the exemplary embodiments of the present invention can be distributed for better performance, reliability, cost, and the like.

As stated above, the devices and subsystems of the exemplary embodiments of FIGS. 1 to 7 can include computer readable medium or memories for holding instructions programmed according to the teachings of the present invention and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave, or any other suitable medium from which a computer can read.

While the present invention have been described in connection with a number of exemplary embodiments and implementations, the present invention is not so limited, but rather covers various modifications and equivalent arrangements, which fall within the purview of the appended claims.

The invention claimed is:

1. A method for route planning using a raster, the raster including a plurality of pixels, and each pixel corresponding to a plurality of bits, the method comprising:
   encoding, by a computing system, the plurality of bits for each pixel, of the plurality of pixels, to indicate whether the pixel has an inter-plane connection between a first two-dimensional coordinate plane and a second two-dimensional coordinate plane offset from the first two-dimensional coordinate;
   receiving, by the computing system, a user request for a route from a start point to an end point;
   generating, by the computing system, the route from the start point to the end point based on the encoded plurality of bits for each pixel to indicate whether the pixel has the inter-plane connection; and
   providing, by the computing system and for display to a user, the generated route from the start point to the end point for one or both of vehicle navigation and pedestrian navigation, wherein a display of the generated route is based at least in part on the encoded plurality of pixels.

2. The method of claim 1, further comprising:
   generating a graphical representation of the raster with the plurality of pixels,
   wherein the graphical representation comprises a plurality of nodes and indicates connections between the plurality of nodes, and
   wherein the generating the route is based on using the generated graphical representation and the connections between the plurality of nodes.

3. The method of claim 2, wherein a first subset of the plurality of nodes are in the first two-dimensional coordinate plane, wherein a second subset of the plurality of nodes are in the second two-dimensional coordinate plane, and wherein the plurality of bits indicates connections between nodes from the first subset of the plurality of nodes and nodes from the second subset of the plurality of nodes.

4. The method of claim 3, wherein the plurality of bits further indicates nodes from the first subset of the plurality of nodes and nodes from the second subset of the plurality of nodes that are not connected.

5. The method of claim 2, wherein a first pixel from the plurality of pixels corresponds to a first node from the plurality of nodes and a second node from the plurality of nodes, wherein the first node is in the first two-dimensional coordinate plane and the second node is in the second two-dimensional coordinate plane, and wherein the plurality of bits for the pixel indicates a connection between the first node and the second node.

6. The method of claim 5, wherein a second pixel from the plurality of pixels corresponds to a third node from the plurality of nodes and a fourth node from the plurality of nodes, wherein the third node is in the first two-dimensional coordinate plane and the fourth node is in the second two-dimensional coordinate plane, and wherein the plurality of bits for the pixel indicates that there is not a connection between the third node and the fourth node.

7. The method of claim 6, wherein the third node is connected to the first node in the first two-dimensional coordinate plane and the fourth node is connected to the third node in the second two-dimensional coordinate plane.

8. The method of claim 1, wherein the plurality of bits for each pixel, of the plurality of pixels, further indicates whether the pixel has an inter-plane connection between the first two-dimensional coordinate plane and a third two-dimensional coordinate plane, wherein the third two-dimensional coordinate plane is offset from the first two-dimensional coordinate plane and the second two-dimensional coordinate plane.

9. The method of claim 1, wherein the first two-dimensional coordinate plane corresponds to a ground plane and the second two-dimensional coordinate plane corresponds to a tunnel plane, wherein the tunnel plane has a lower elevation compared to the ground plane.

10. The method of claim 1, wherein the first two-dimensional coordinate plane corresponds to a ground plane and the second two-dimensional coordinate plane corresponds to a bridge plane, wherein the bridge plane has a higher elevation compared to the ground plane.

11. The method of claim 1, wherein each pixel further corresponds to a plurality of second bits, and wherein the plurality of second bits indicates a two-dimensional coordinate plane that each pixel occupies or a type of land cover or structure the pixel represents.

12. The method of claim 1, wherein the generated route comprises a first section on the first two-dimensional coordinate plane and a second section on the second two-dimensional coordinate plane, and wherein the generated route traverses from the first section to the second section via the inter-plane connection.

13. A computer-implemented system for route planning using a raster, the raster including a plurality of pixels, and each pixel corresponding to a plurality of bits, the system comprising:
   at least one processor; and
   memory storing instructions that, when executed by the at least one processor, cause the system to perform a set of operations, the set of operations comprising:
      encoding the plurality of bits for each pixel, of the plurality of pixels, to indicate whether the pixel has an inter-plane connection between a first two-dimensional coordinate plane and a second two-dimensional coordinate plane offset from the first two-dimensional coordinate plane;
      receiving a user request for a route from a start point to an end point;
      generating the route from the start point to the end point based on the encoded plurality of bits for each pixel to indicate whether the pixel has the inter-plane connection; and
      providing, by the system and for display to a user, the generated route from the start point to the end point for one or both of vehicle navigation and pedestrian navigation.

14. The system of claim 13, wherein the set of operations further comprises generating a graphical representation of the two-dimensional raster with the plurality of pixels, wherein the graphical representation comprises a plurality of nodes and indicates connections between the plurality of nodes, and wherein the route is generated based on the generated graphical representation and the connections between the plurality of nodes.

15. The system of claim 14, wherein a first subset of the plurality of nodes are in the first two-dimensional coordinate plane, wherein a second subset of the plurality of nodes are in the second two-dimensional coordinate plane, and wherein the plurality of bits indicates connections between nodes from the first subset of the plurality of nodes and nodes from the second subset of the plurality of nodes.

16. The system of claim 14, wherein the plurality of bits further indicates nodes from the first subset of the plurality of nodes and nodes from the second subset of the plurality of nodes that are not connected.

17. A method of route planning, comprising:
receiving, by a computing system, a user request for a route from a start point to an end point: and
generating, by the computing system, the route from the start point to the end point using a raster that includes a plurality of pixels, wherein a pixel of the raster indicates a first inter-plane connection between a first two-dimensional coordinate plane and a second two-dimensional coordinate plane offset from the first two-dimensional coordinate plane, and wherein the generated route includes a first section that traverses from the first two-dimensional coordinate plane to the second two-dimensional coordinate plane at the first inter-plane connection; and providing, by the computing system and for display to a user, the generated route from the start point to the end point for one or both of vehicle navigation and pedestrian navigation, wherein a display of the generated route is based at least in part on the pixel of the raster.

18. The method of claim 17, wherein the pixel is a first pixel and a second pixel of the raster further indicates a second inter-plane connection between the first two-dimensional coordinate plane and the second two-dimensional coordinate plane, and wherein the generated route includes a second section that travels from the second two-dimensional coordinate plane back to the first two-dimensional coordinate plane at the second inter-plane connection.

19. The method of claim 18, wherein the first two-dimensional coordinate plane corresponds to a ground plane and the second two-dimensional coordinate plane corresponds to a tunnel plane, wherein the tunnel plane has a lower elevation compared to the ground plane.

20. The method of claim 18, wherein the first two-dimensional coordinate plane corresponds to a ground plane and the second two-dimensional coordinate plane corresponds to a bridge plane, wherein the bridge plane has a higher elevation compared to the ground plane.

* * * * *